United States Patent
Berger et al.

(10) Patent No.: US 11,768,368 B2
(45) Date of Patent: Sep. 26, 2023

(54) SPECTACLES AND METHOD FOR DETERMINING THE PUPIL CENTER

(71) Applicant: Viewpointsystem GmbH, Vienna (AT)

(72) Inventors: Nils Berger, Schaan (LI); Frank Linsenmaier, Weinstadt (DE)

(73) Assignee: VIEWPOINTSYSTEM GMBH, Vienna (AT)

( * ) Notice: Subject to any disclaimer, the term of this patent is extended or adjusted under 35 U.S.C. 154(b) by 0 days.

(21) Appl. No.: 17/922,372

(22) PCT Filed: May 14, 2020

(86) PCT No.: PCT/EP2020/063509
§ 371 (c)(1),
(2) Date: Oct. 30, 2022

(87) PCT Pub. No.: WO2021/228399
PCT Pub. Date: Nov. 18, 2021

(65) Prior Publication Data
US 2023/0130907 A1    Apr. 27, 2023

(51) Int. Cl.
*G02B 27/00* (2006.01)
*G02B 27/01* (2006.01)

(52) U.S. Cl.
CPC ..... *G02B 27/0093* (2013.01); *G02B 27/0101* (2013.01); *G02B 27/017* (2013.01); *G02B 2027/014* (2013.01); *G02B 2027/0138* (2013.01); *G02B 2027/0178* (2013.01)

(58) Field of Classification Search
USPC .......................................................... 345/8
See application file for complete search history.

(56) References Cited

U.S. PATENT DOCUMENTS

| | | | | |
|---|---|---|---|---|
| 4,300,818 A | * | 11/1981 | Schachar | A61B 3/103 351/158 |
| 4,762,407 A | * | 8/1988 | Anger | G02C 13/003 351/200 |
| 9,665,172 B2 | | 5/2017 | Engwall | |
| 2001/0028309 A1 | * | 10/2001 | Torch | A61B 5/1103 340/576 |
| 2006/0274258 A1 | * | 12/2006 | Shirayanagi | G02C 7/02 351/159.71 |
| 2013/0050432 A1 | * | 2/2013 | Perez | G06F 3/011 348/47 |
| 2014/0055746 A1 | * | 2/2014 | Nistico | A61B 3/107 351/206 |

(Continued)

FOREIGN PATENT DOCUMENTS

| EP | 1300018 A1 | 4/2003 |
|---|---|---|
| EP | 2499962 A1 | 9/2012 |

OTHER PUBLICATIONS

International Search Report and Written Opinion from corresponding International Application No. PCT/EP2020/063509, dated Feb. 12, 2021, 11 pages.

*Primary Examiner* — Chineyere D Wills-Burns
(74) *Attorney, Agent, or Firm* — TUCKER ELLIS LLP

(57) ABSTRACT

The present invention concerns improved spectacles, system and method for eye tracking able to detect the pupil position of different types of wearers. The detection of the pupil is improved over the prior art on the basis of a new specific position of the eye cameras on the spectacles frame.

14 Claims, 14 Drawing Sheets

(56) References Cited

U.S. PATENT DOCUMENTS

| | | | |
|---|---|---|---|
| 2014/0055747 A1* | 2/2014 | Nistico | A61B 3/14 |
| | | | 351/246 |
| 2015/0061996 A1* | 3/2015 | Gustafsson | G06F 3/013 |
| | | | 345/156 |
| 2016/0073874 A1* | 3/2016 | Tsai | A61B 5/1103 |
| | | | 351/210 |
| 2016/0206196 A1* | 7/2016 | Pfleger | G02C 5/12 |
| 2017/0035293 A1* | 2/2017 | Nistico | A61B 3/024 |
| 2018/0184958 A1* | 7/2018 | Publicover | A61B 3/112 |
| 2019/0227336 A1* | 7/2019 | Parrett | G02B 5/0215 |
| 2021/0049410 A1* | 2/2021 | Dierkes | G06N 3/08 |

* cited by examiner

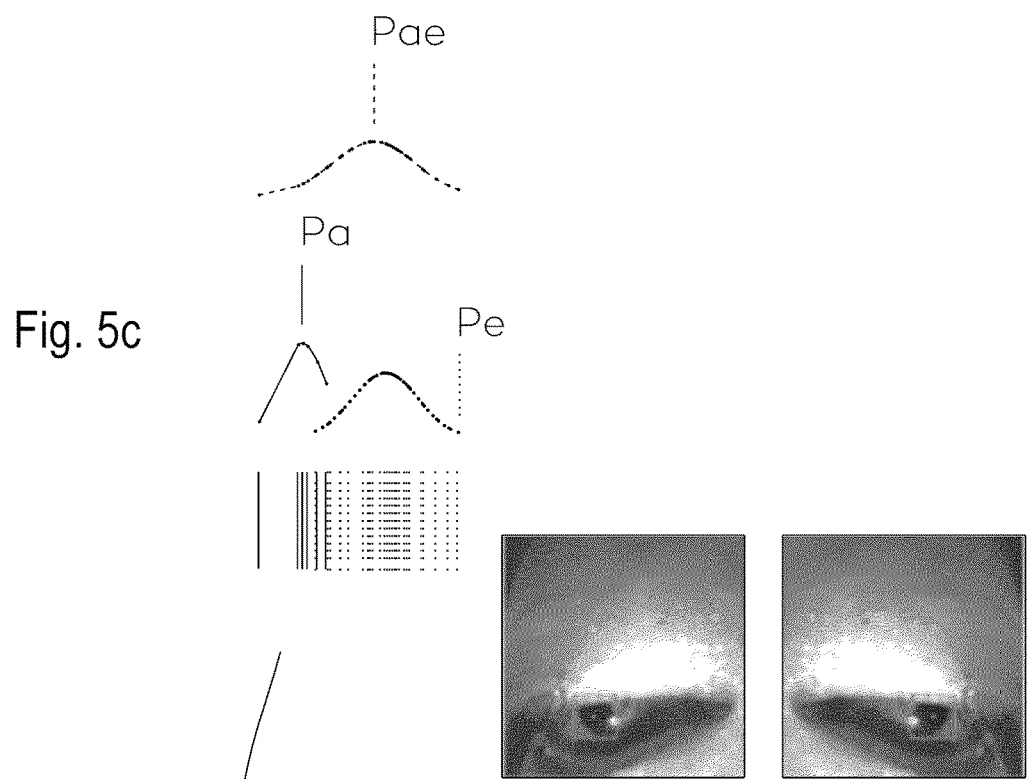
Fig. 5c
Fig. 5b
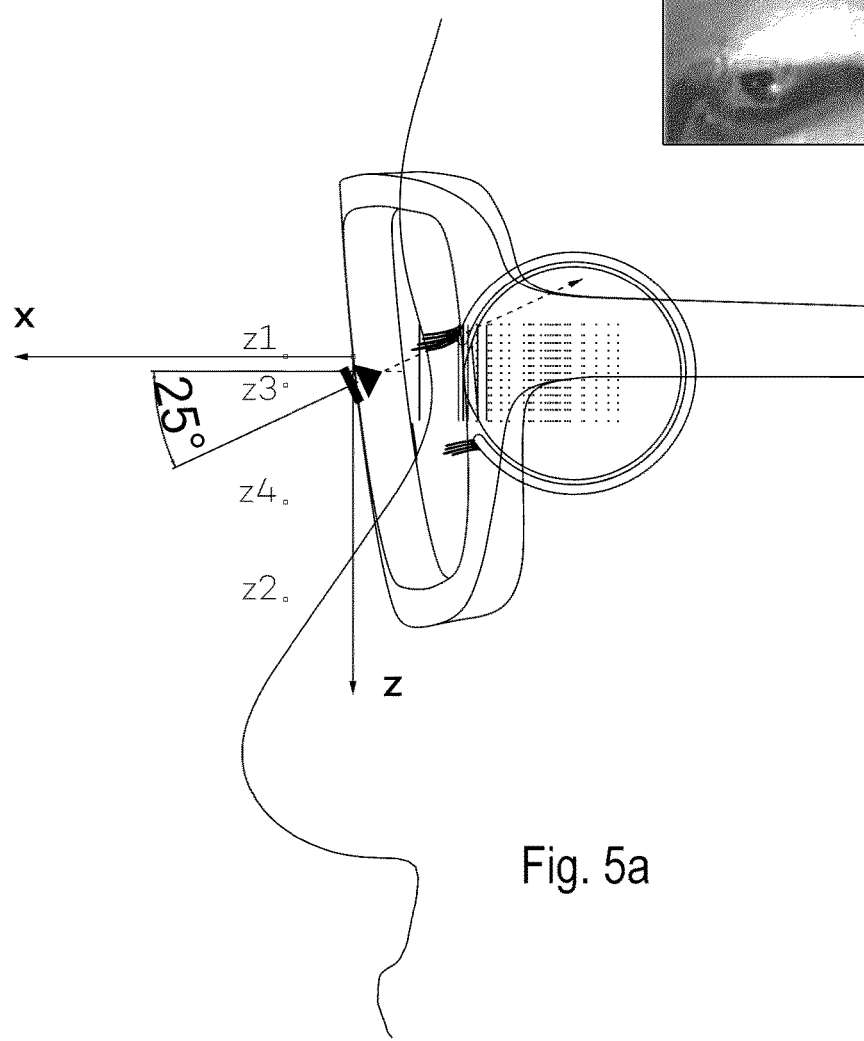
Fig. 5a

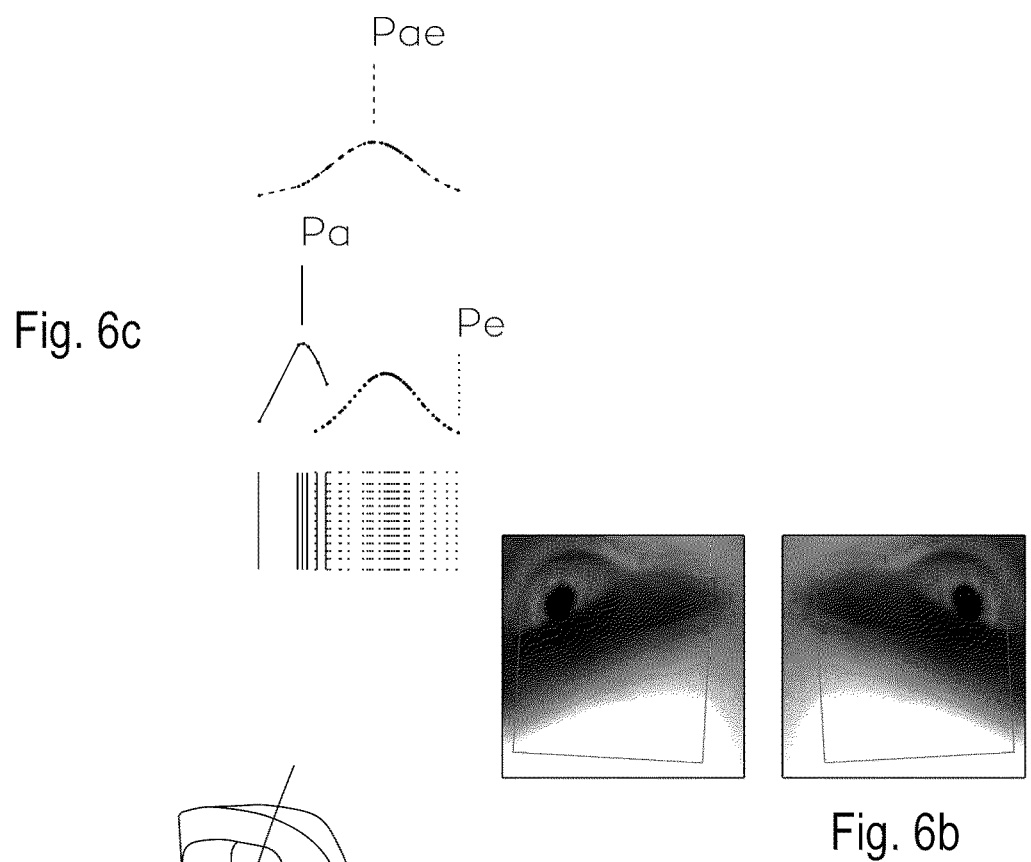
Fig. 6c
Fig. 6b
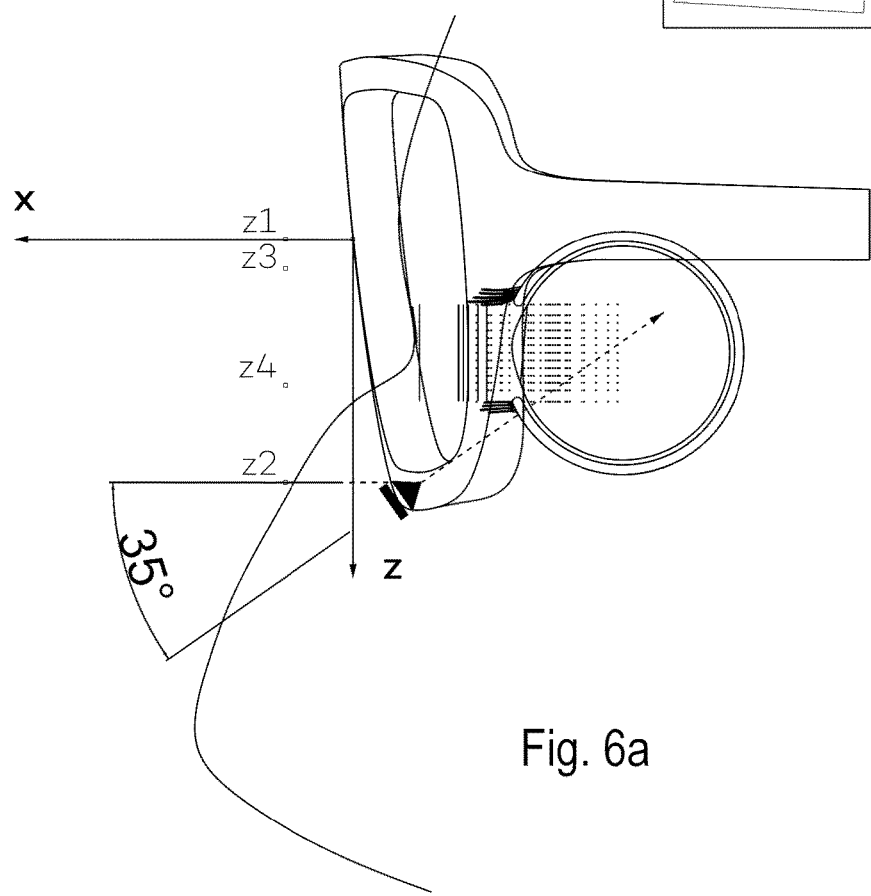
Fig. 6a

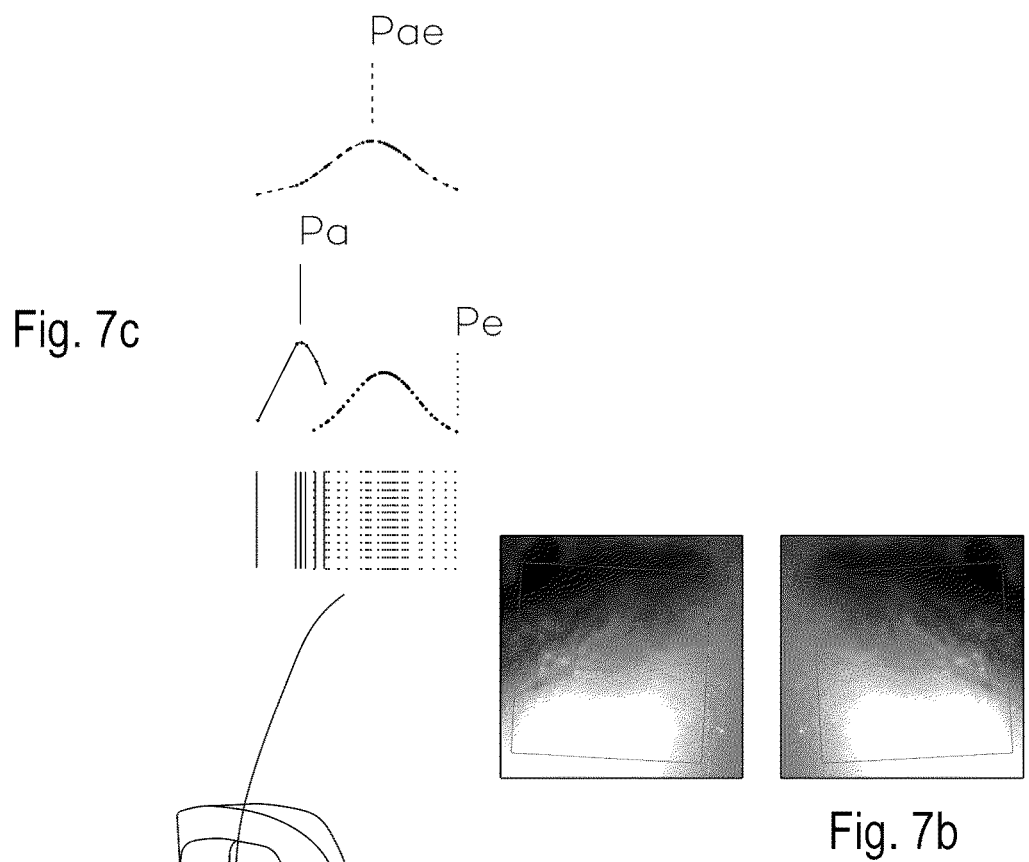
Fig. 7b
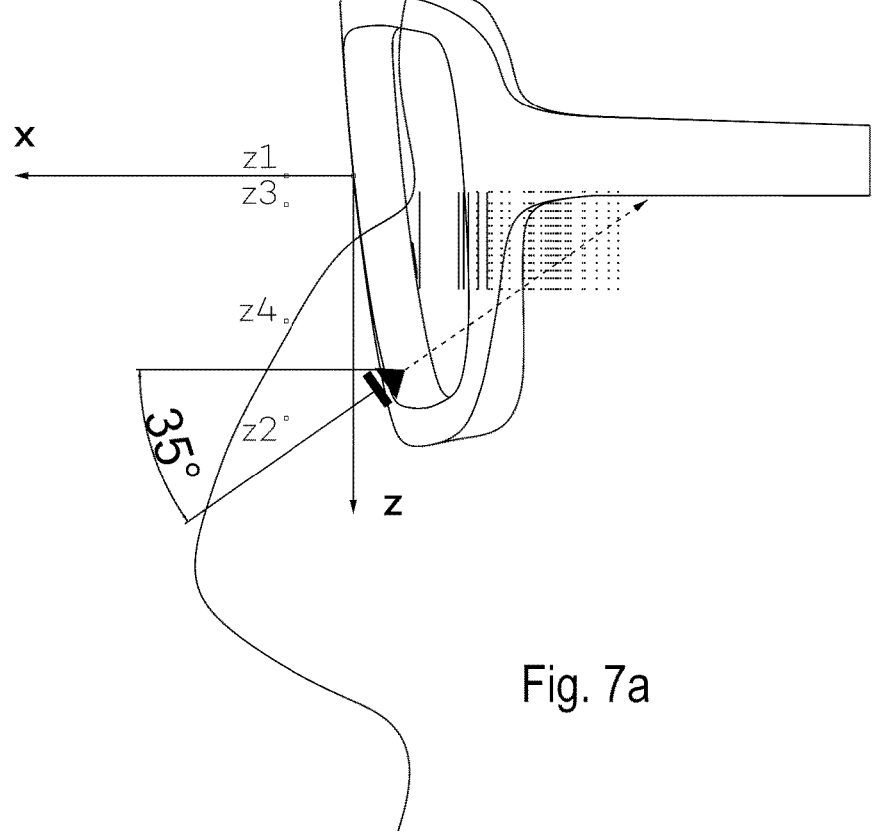
Fig. 7c
Fig. 7a

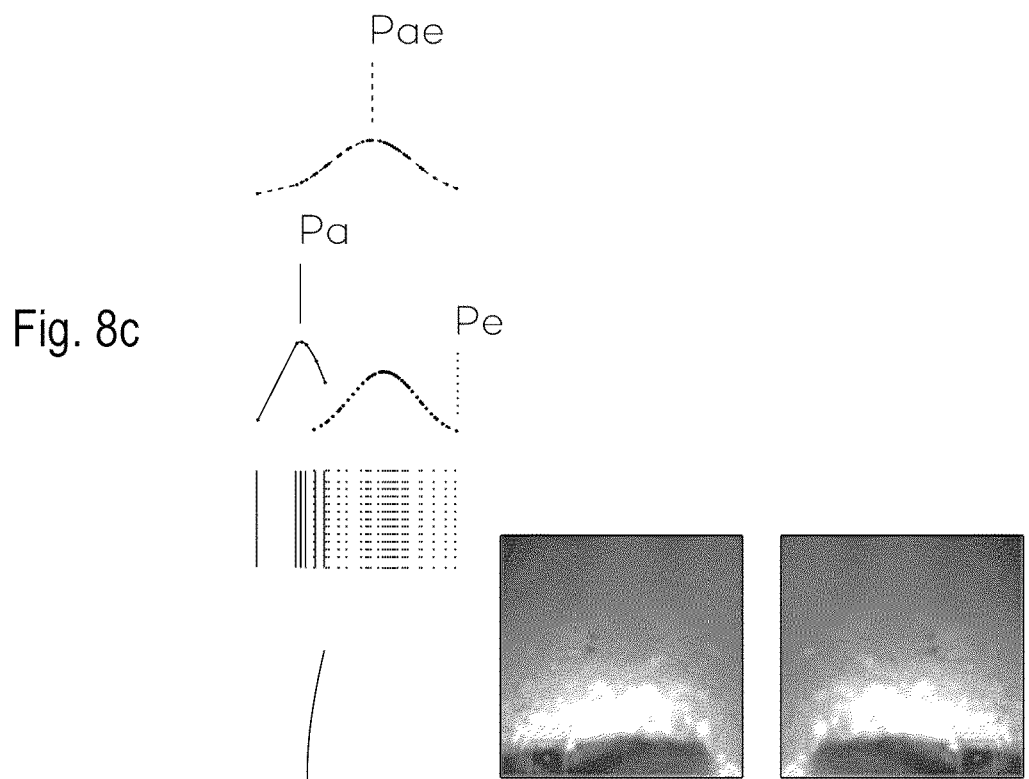
Fig. 8b
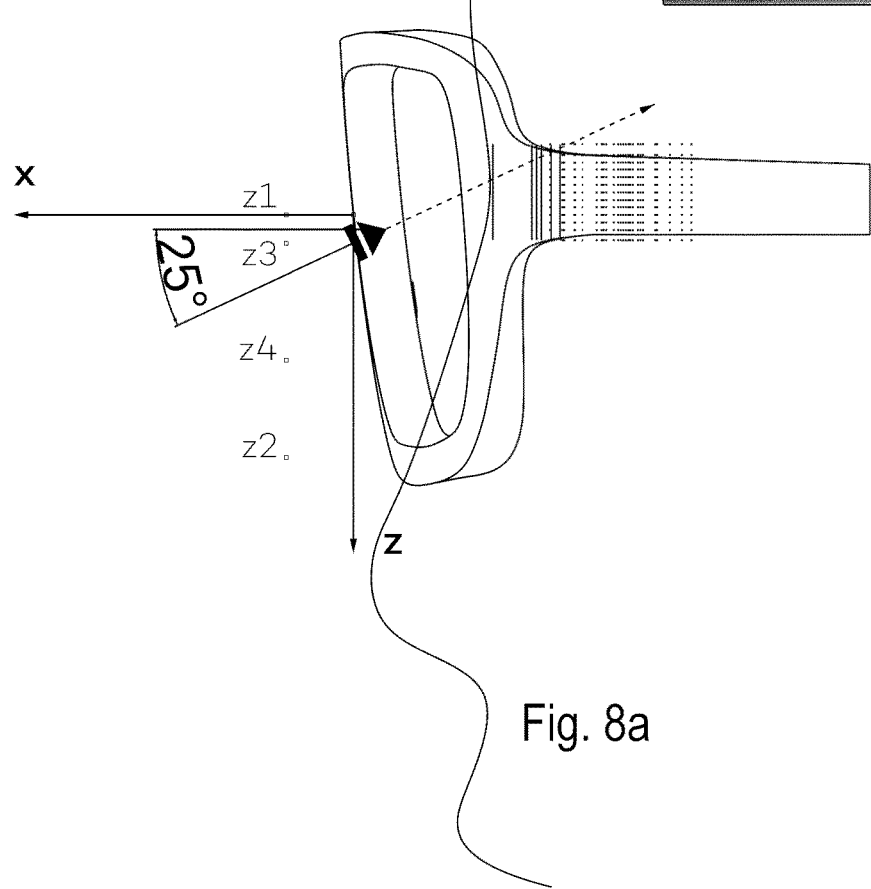
Fig. 8c
Fig. 8a

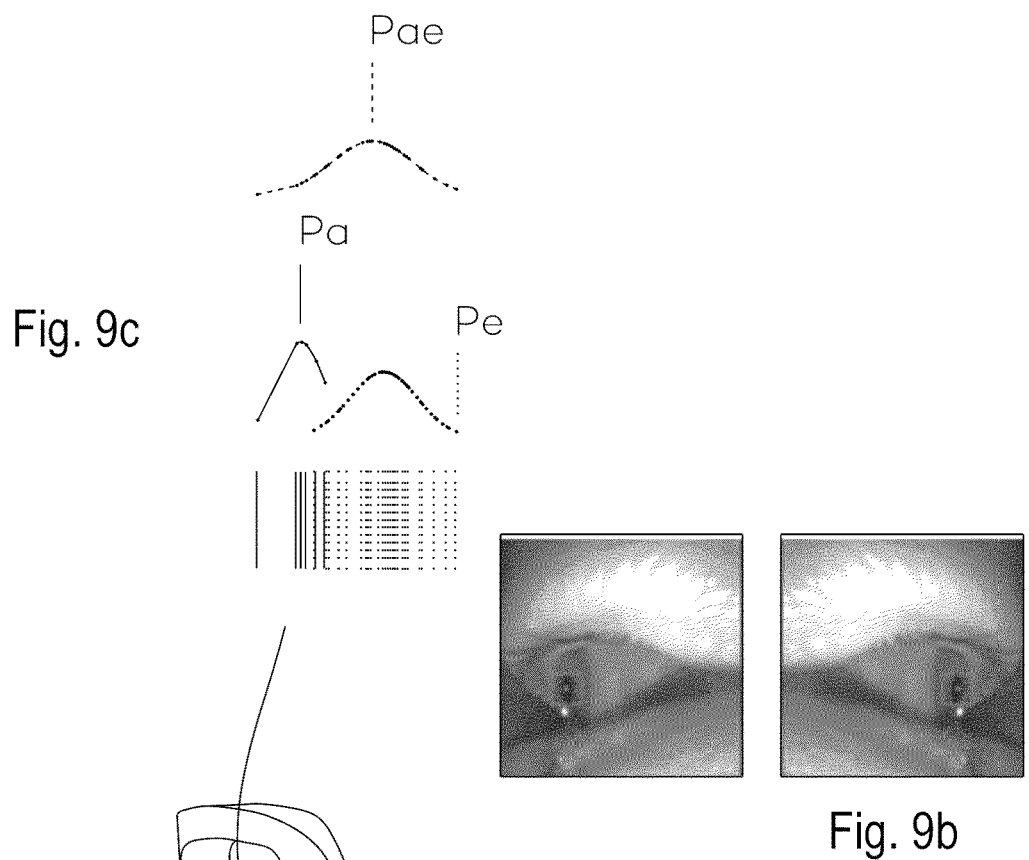
Fig. 9c
Fig. 9b
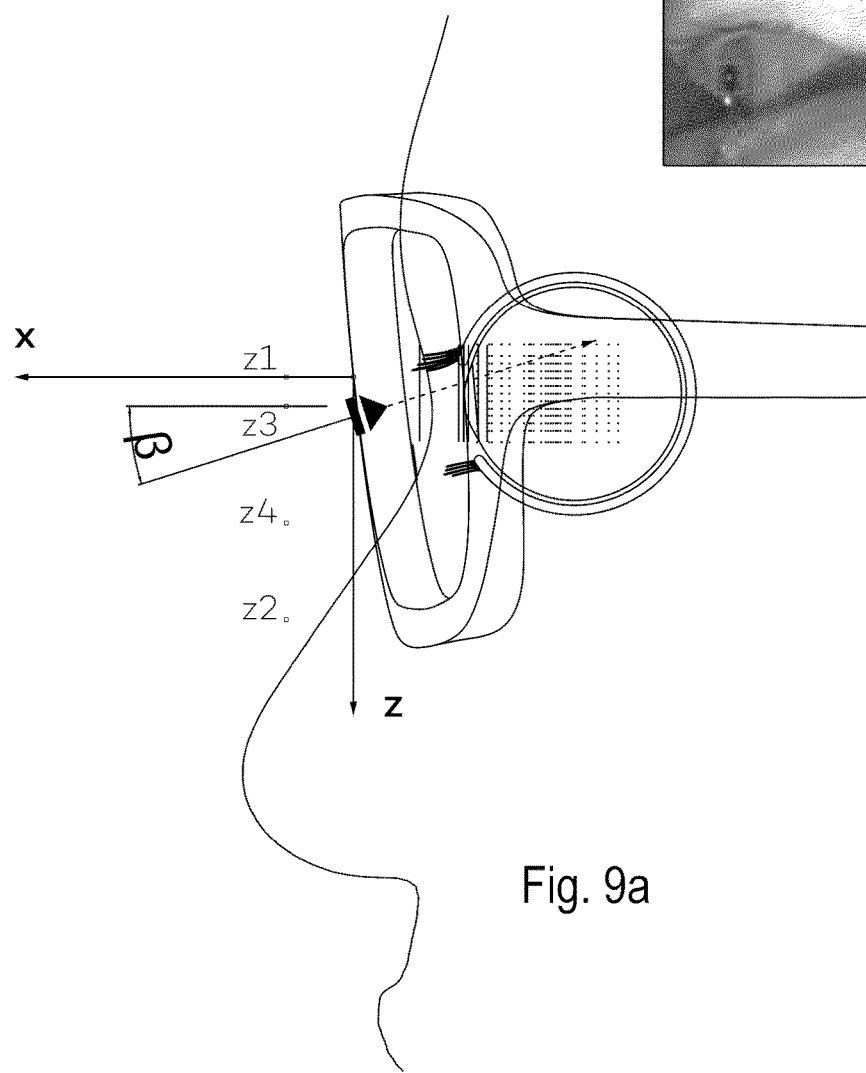
Fig. 9a

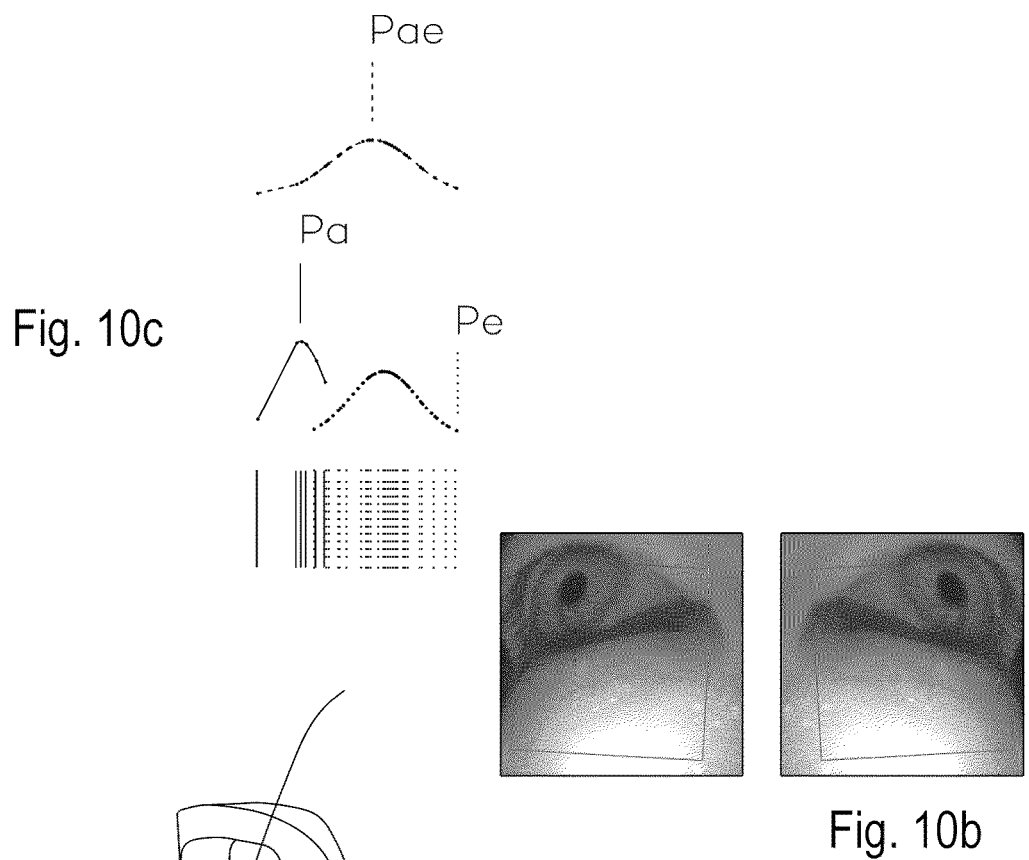
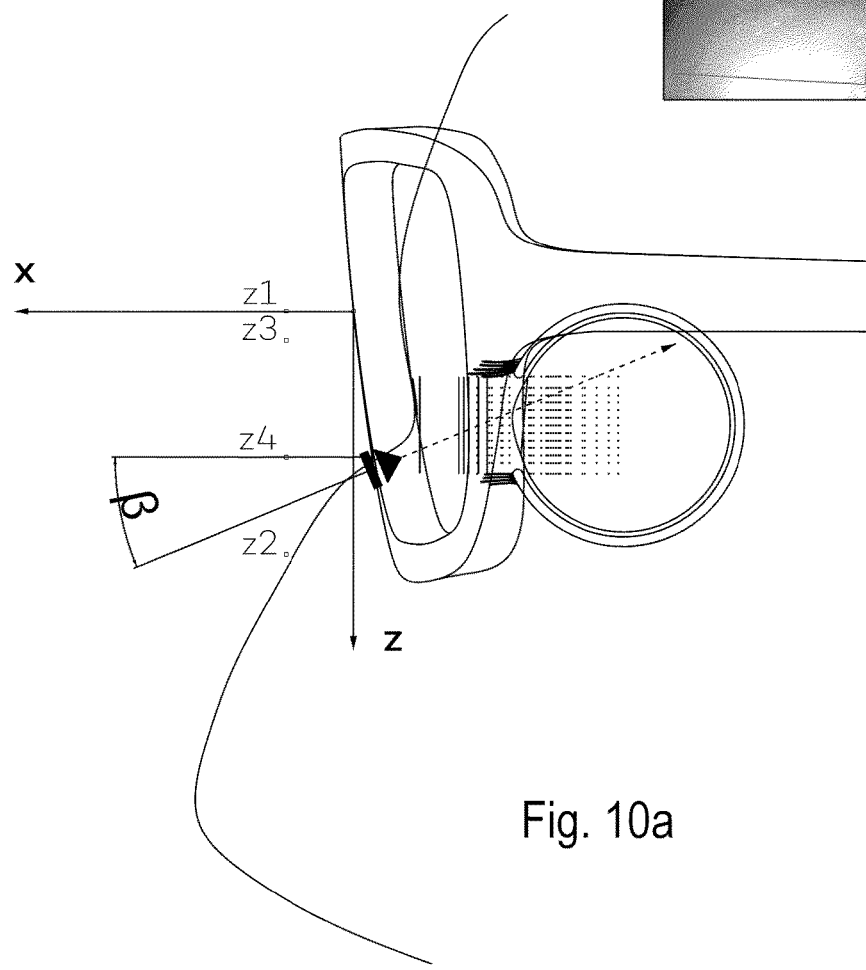
Fig. 10a
Fig. 10b
Fig. 10c

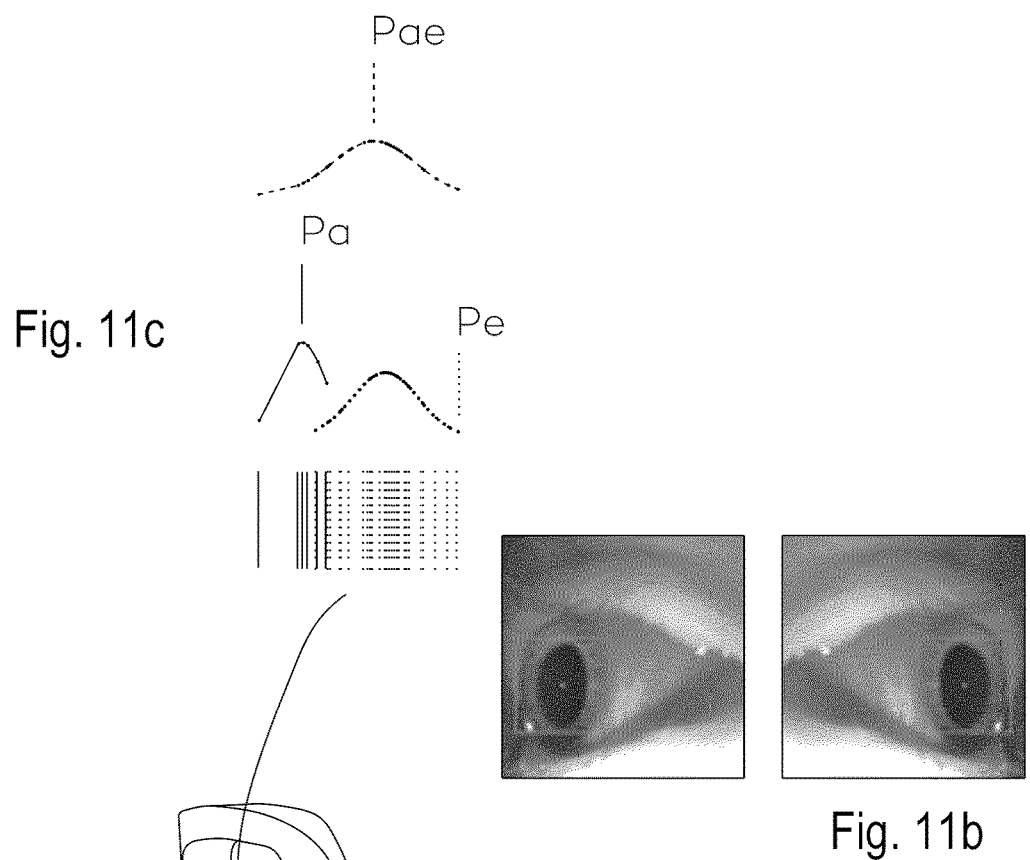
Fig. 11b
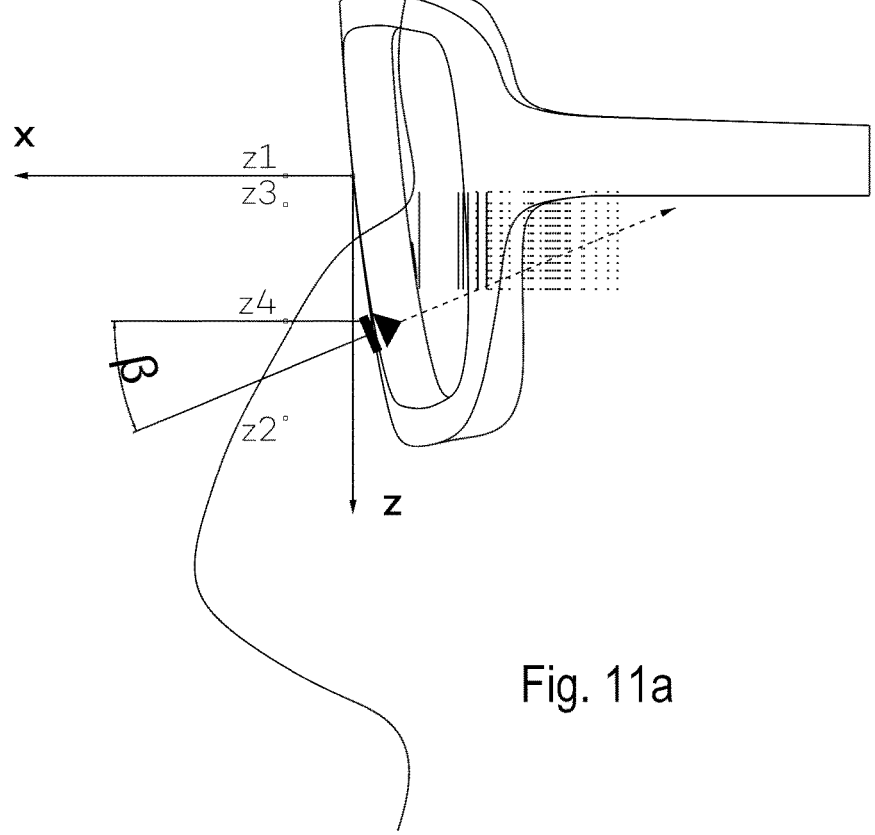
Fig. 11c
Fig. 11a

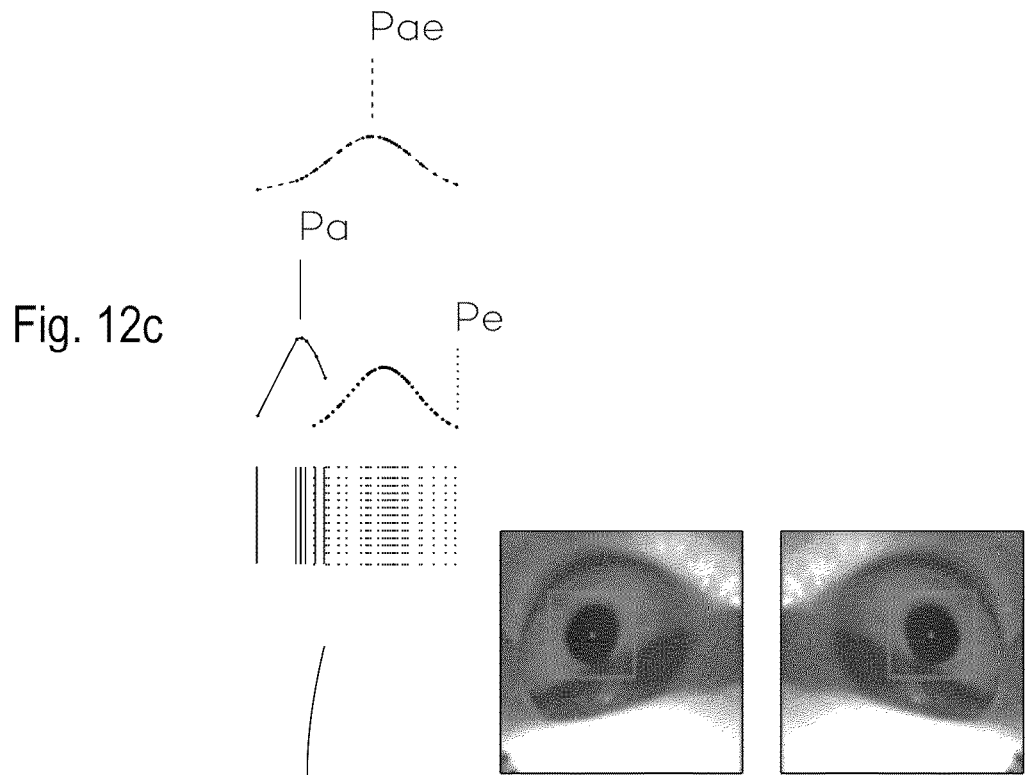
Fig. 12c
Fig. 12b
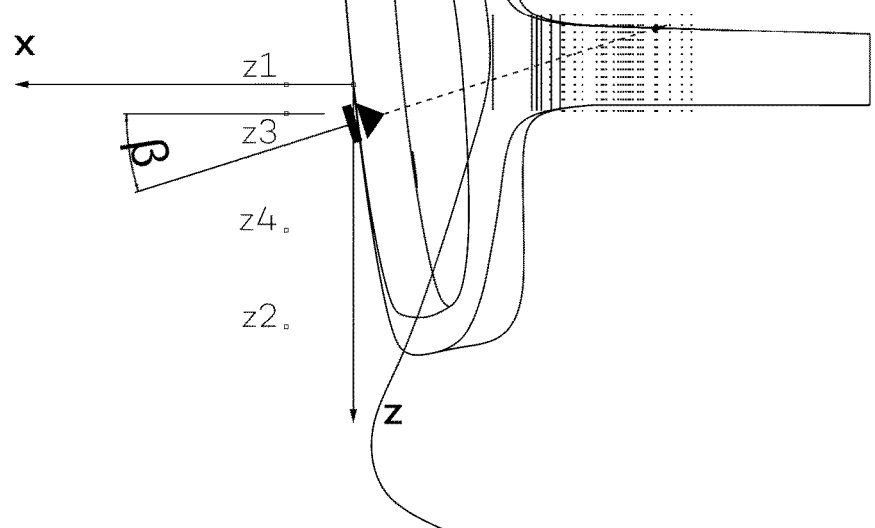
Fig. 12a

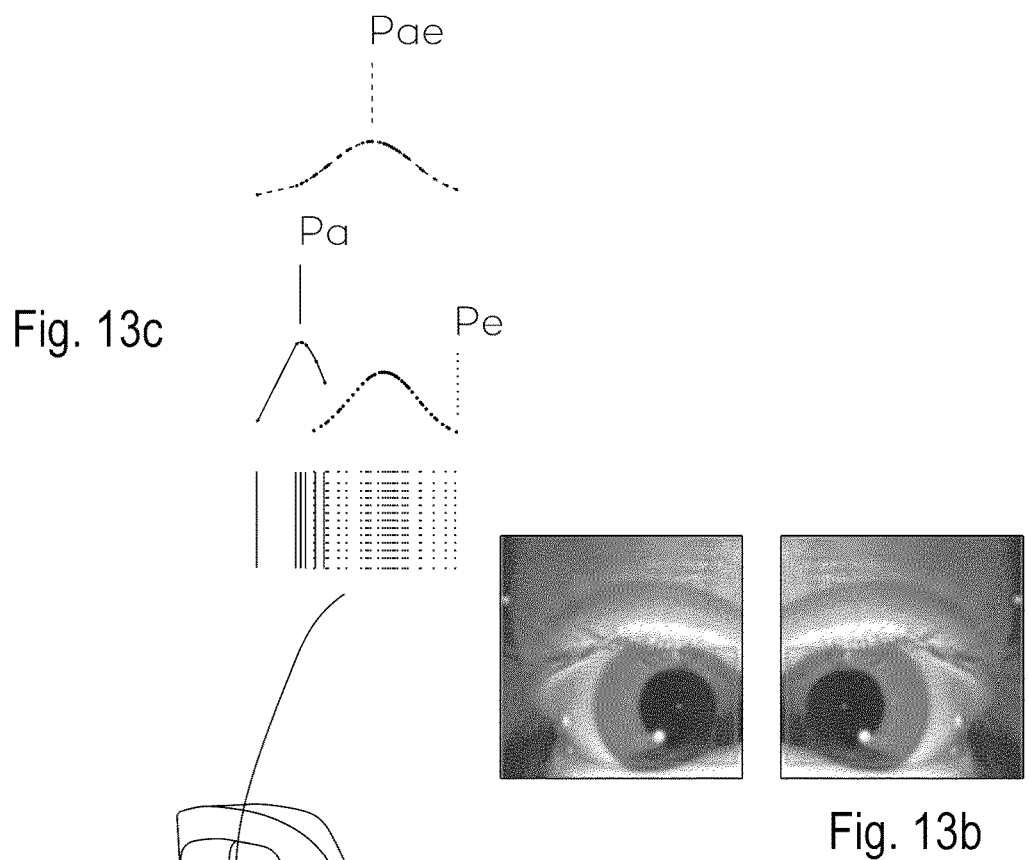
Fig. 13c
Fig. 13b
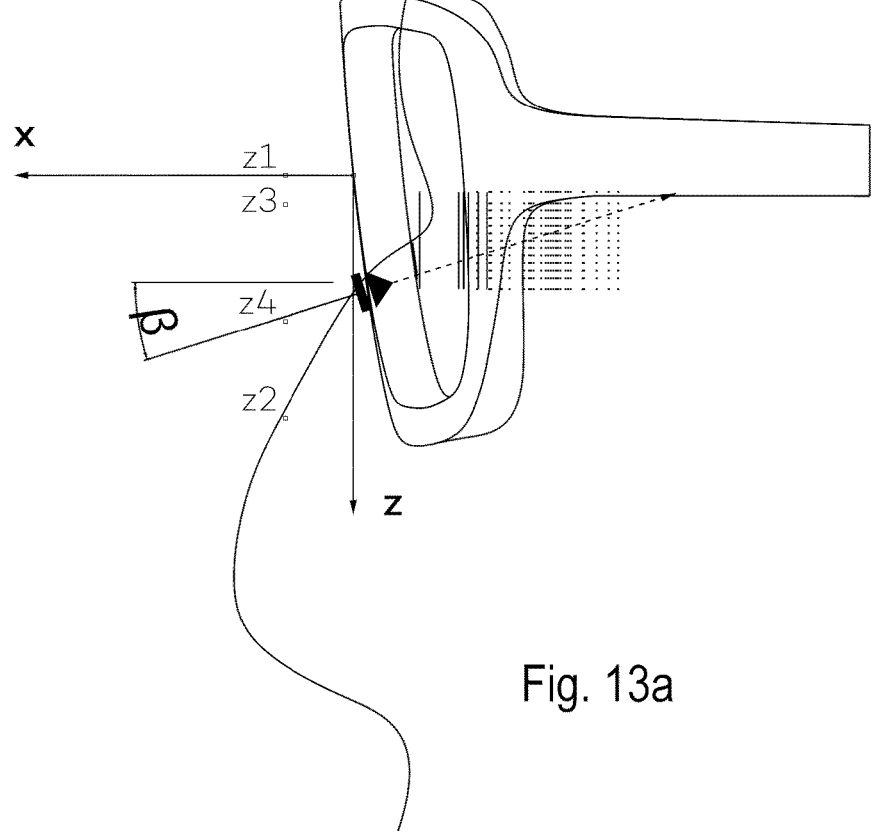
Fig. 13a

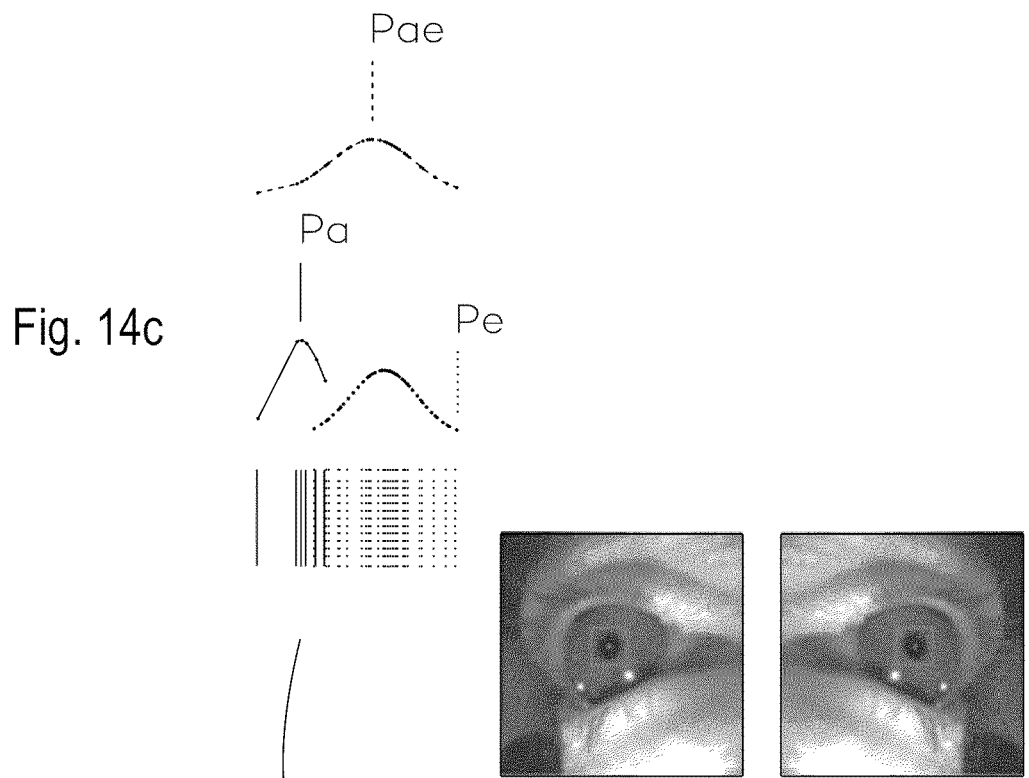
Fig. 14b
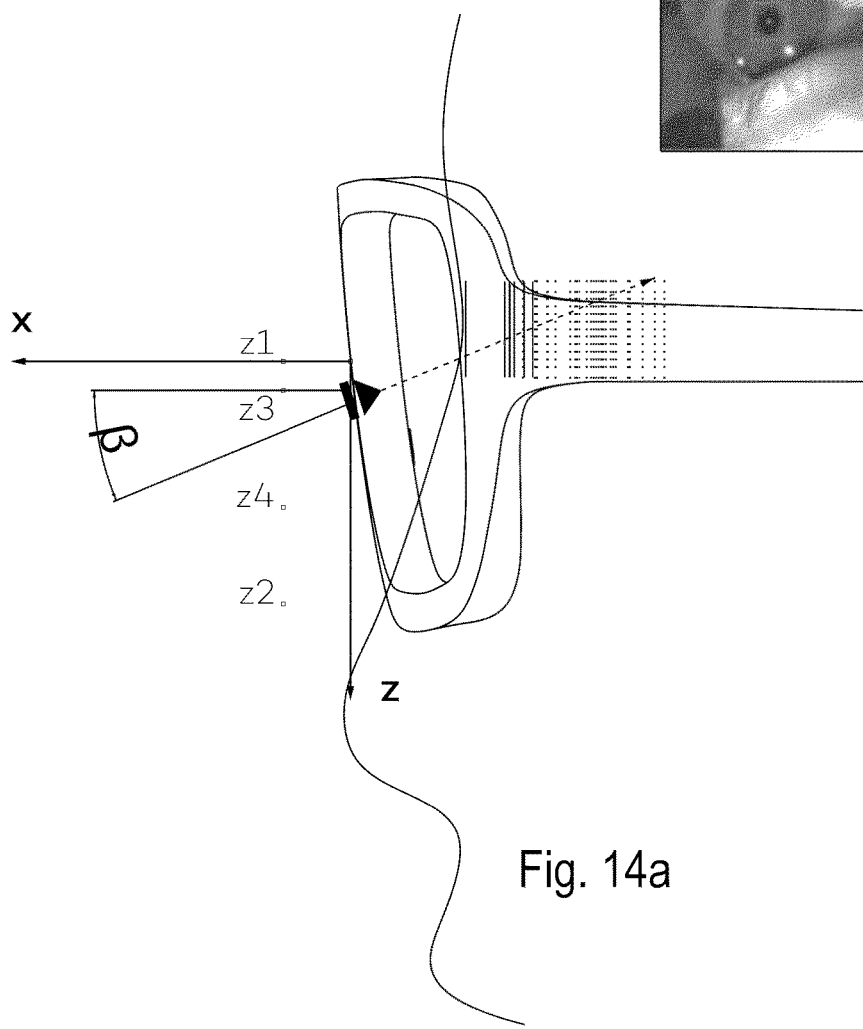
Fig. 14c
Fig. 14a

SPECTACLES AND METHOD FOR DETERMINING THE PUPIL CENTER

TECHNICAL BACKGROUND

The present invention concerns spectacles and a method for determining the pupil center of a wearer, in particular this invention concern eye-tracking spectacles.

Eye-tracking spectacles usually comprise a camera, which is oriented onto an eye of the relevant spectacles wearer; the coordinates of the pupil and the viewing direction of the eye can be ascertained using such spectacles. Together with a so-called field of vision video, which is prepared by a further field of vision camera arranged on the spectacles in the viewing direction of a user, the point at which the user looks can be ascertained using such spectacles.

These known spectacles have the disadvantage that the arrangement of the camera can itself result in impairment of the behaviour of the user. Such spectacles are generally conceived as a measurement device or research utensil and are also clearly recognizable as such. Test persons do accept the relevant spectacles in regions separated from public view, such as a vehicle or a special test environment, but, above all in environments in which the relevant test person has to act unshielded from other surrounding people, they result in an influence of the behaviour of the test person and the persons in the surroundings. The feedback which a human receives from the reactions of his surroundings to his own appearance often has a direct influence on the behaviour of the relevant person. This influence leads via the unconscious and therefore withdraws direct control by the relevant person. Publicly wearing a clearly recognizable and striking apparatus on the head results in reactions of the surroundings, which in turn can have direct influence on the behaviour, also the viewing behaviour, of the relevant test person. In difficult test situations in this regard, this can result in a high level of influence of the test result by way of the means of the test itself.

Such known spectacles record the eye of the test person from the bottom front. It has been shown that this camera position can have negative effects on the accuracy and quality of the achieved measurement results.

These known spectacles additionally have the disadvantage that the protruding parts, such as cameras and cables, restrict the possible uses of such known spectacles for the research uses. For example, such spectacles represent a substantial risk of accident in the surroundings of rapidly rotating machines. Pieces of clothing or equipment objects worn on the body having loops or protruding parts are forbidden in numerous work environments for reasons of safety.

PRIOR ART

US2016/0206196 discloses an eye-tracking spectacles aiming to solve the relevant disadvantages mentioned above.

This prior art document describes an eye-tracking spectacles comprising two eye cameras arranged in the nose frame of the glasses and a view camera in the middle of the glasses.

In particular according to one preferred embodiment of the prior art invention, it is provided that at least one field of vision camera is arranged on the glasses frame. The field of vision camera is provided to record a field of vision video including individual and successive field of vision images. The recordings of the two eye acquisition cameras and the at least one field of vision camera can thus be entered in correlation in the field of vision video of the respective viewpoint.

Furthermore by arranging the eye acquisition camera in the nose frame part, influence of the pupil detection by eyelashes surrounding the eye can be reduced. Furthermore, the influence of interfering reflections on the pupils can thus be reduced. The blinking of the wearer can also be recognized more exactly than previously by detecting both eyes of a wearer.

In this document it is explained that making reference to FIGS. 8, 9, and 10 a coordinate system is shown. Proceeding from the symmetry of the invented spectacles, this coordinate system was selected such that the YZ plane spanned by the Y axis and the Z axis on the right and left sides of the spectacles each intersect opposing and symmetrically-arranged regions divided by the symmetry plane XZ. The XZ symmetry plane spanned by the X axis and the Z axis is arranged on the YZ plane perpendicularly and in parallel to the plane of symmetry of the spectacles. The XY plane is arranged perpendicularly to the YZ plane and the XZ plane. The right eye acquisition camera and the left eye acquisition camera are each arranged inclined in relation to these planes or axes. In this case, according to one preferred embodiment, it is provided that in each case one optical axis of the two eye acquisition cameras is arranged at a first angle in relation to the Y axis which is perpendicular to the symmetry plane XZ, and the first angle is between 30° and 50°. Furthermore, it is provided according to the preferred embodiment that in each case one optical axis of the two eye acquisition cameras is arranged at a second angle in relation to the X axis, and the second angle is between 25° and 35°.

The invented spectacles achieve good results in detecting the position of the wearer pupils but they encounter difficulties with the particular configuration of the forehead and eyes of Asian people characterized by a very low distance between the nose bridge and the pupils of the wearer. In this case in fact Asian people due to their configuration of the eyes, noses, foreheads and in general of their head profile, are obliged to keep fitted the spectacles very close to the eyes, thus furthermore leading a possible interferences with eyelashes and eyelids of the wearer impeding the detection of the position of the pupils, in particular when the eye cameras are arranged in the highest position of the nose frame.

This invention is particularly related to a European and North American wearer, in fact it is stated in the description that spectacles for the Asiatic, African, Latin American, or Pacific region are accordingly to be designed using other values, in consideration of the specifications of the wearer.

Another disadvantage related to the mentioned prior art document concerns distortion related to field of view of the eye cameras which is not well optimised in the previous patent description, because in some positions, in particular the lower positions of the eye cameras along the nose frame, i.e. being far from the pupils, leads to higher distortion in the field of view corners and this in turn leads to less information detected in those corners.

A further disadvantage of the prior art technology related to the lowest positions of the eye cameras in the nose frame concerns possible interferences with the cheekbones/eyelashes/eyelids of the wearer that could lead to obstacles and interferences with the detection of the wearer's pupils.

PURPOSES OF THE INVENTION

One objective of the present invention, according to a first of its aspects, is obtaining eye tracking spectacles and a system being able to detect pupil position of most ethnics of human beings, and in particular both European wearers and Asian wearers, without necessity of a predetermined set of different nosebridges.

A second objective of the present invention is obtaining eye tracking spectacles and a system able to detect pupil position of most ethnics of human beings with different shape of noses thus leading to different way of wearing the eye tracking spectacles, without necessity of a predetermined set of different nosebridges.

A third objective of the present invention is obtaining eye tracking spectacles and a system able not only the pupil position of most ethnics of human beings like for instance European and Asian People, but also to detect a larger number of different positions of the detected human beings compared to the technology disclosed in prior art documents.

A further objective is to obtain eye tracking spectacles and a system able to reduce interferences related to possible eyelid and eyelash in the highest positions of the eye cameras in the nose frame and in the same time to reduce interferences related to possible cheekbones/eyelids/eyelashes in the lowest positions of the eye cameras in the nose frame.

A further objective of the present invention is to provide eye tracking spectacles and system for detection of the pupil position of most ethnics of human beings, having a high level of measurement accuracy with respect to the viewing direction of the eyes of a user, and which can be worn inconspicuously, so that no influence of the behavior of the user is provided because of wearing the spectacles.

A further objective of the present invention is obtaining eye tracking spectacles and a system working in an optimizes way reducing distortion problems in the corners of the Field of View for detection of the pupil position of most ethnics of human beings.

Another objective of the present invention is to provide eye tracking spectacles and system achieving significantly improved results for detection of the pupil position of most ethnics of human beings, since both the measurement accuracy is increased, and the measurement apparatus can now no longer be perceived by the surroundings and therefore also does not result in negative influences of the test person, reducing the need to have a lot of nose pads to adapt the spectacles to different wearers and at the same time suitable to be worn as work spectacles or protective spectacles.

A further objective of the present invention is to provide a method for determining the position of wearers' pupils of most different ethnics in particular Asian and European and North American peoples, furthermore for detecting the viewing direction, the focal distance, and the blinking of a human being.

Another object of the present invention is to provide a method for detecting with a high level of accuracy the viewing direction, additionally or alternatively, the focus distance or the focal distance of the eyes, a blink can thus be recognized as a spontaneous blink, whereby different states of the relevant human can be reliably differentiated, for example, between a state of high concentration and a state of fatigue of wearers' pupils of most different ethnics in particular Asian and European and North American peoples.

A further objective of the present invention is to provide spectacles, a related system and the method easily to be designed, with an optimized energy and computational power consumption and extremely efficient.

SUMMARY OF THE INVENTION

Hereinafter are summarized some technical aspects of the present inventions which enable some of the most important purposes to be achieved.

According to a first aspect this invention relates to an eye tracking spectacles comprising a frame, wherein the frame has a U-shaped portion having a right nose frame and a left nose frame and a bridge, wherein a right eye detection camera is arranged in the right nose part frame, and in that a left eye detection camera is arranged in the left nose part frame, said spectacles further comprising a first earpiece and a second earpiece, characterized in that the left eye detection camera and the right eye detection camera are arranged in the corresponding nose part frame in a position referred to a Z axis of a Cartesian system in the range 3 mm≤Z≤15 mm, assuming the cartesian system (X, Y, Z) be placed with its origin corresponding to the maximum of the concave front profile of the U-shaped portion of the spectacles and the X axis is parallel to the lower profile of the earpiece and Z axis is directed downward.

Such spectacles naturally avoid the risk to have eyelids/eyelashes/cheekbones interferences considering also different nose shapes of different somatic traits of different ethics, during the detection of pupil center of a wearer when in use.

Furthermore the right eye detection camera and the left eye detection camera are oriented respect to the assumed Z axis with an angle beta, wherein 17.5°≤beta≤22.5°, thus allowing the spectacles to detect the most possible pupil centers of a wearer of the most different ethnics like for instance Asian people and European people and when in use.

According to a second aspect this invention relates to a method for determining pupil centers of both eyes of a person using the spectacles with the specific position and orientation of the eye cameras already defined, characterized in that to determine the pupil coordinates for each individual image of the eye video with an image recognition program automatically—the contrasts of the pupil with the surroundings are registered—all points of the individual image that are darker than a set degree of darkness, are sought, —a dark area corresponding to the pupil is fully detected and delimited with these points, and the center of gravity of the dark area corresponding to the pupil center is determined with the pupil coordinates.

It enables to detect the pupil centers of a wearer of the most different ethnics like for instance Asian people and European people contemplating their typical somatic traits.

According to a third aspect this invention relates to a method for recognizing a spontaneous blinking of the eye of a person using the spectacles with the specific position and orientation of the eye cameras already defined, detecting when an eyelid covers the relevant pupil center.

It enables to recognize a spontaneous blinking of the eye of a person of the most different ethnics like for instance Asian people and European people contemplating their typical somatic traits.

According to a fourth aspect this invention relates to a method for determining a focus distance of a person using the spectacles with the specific position and orientation of the eye cameras already defined, detecting the eye distance, through the right viewing angle and the left viewing angle.

It enables to determine a focus distance of a person of the most different ethnics like for instance Asian people and European people contemplating their typical somatic traits.

FIGURES

The structural and functional features of the present invention and its advantages with respect to the known prior art, will become even clearer from the underlying claims, and in particular from an examination of the following description, made with reference to the attached figures which show a preferred but not limited schematic embodiment of the invented computer-implemented method, system, device, in which:

Figure 1:
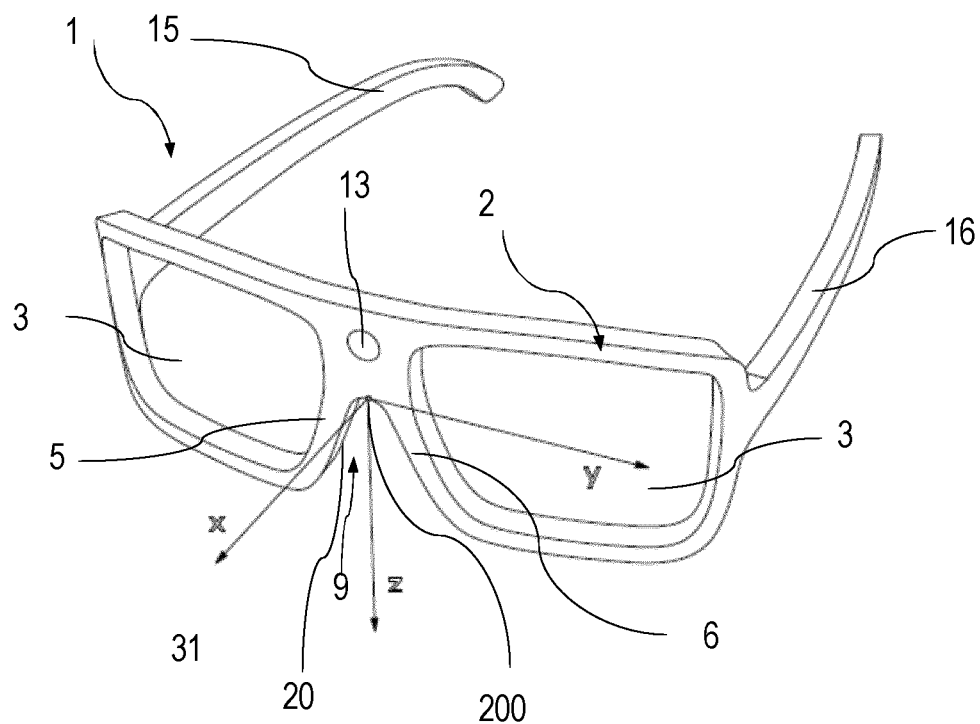
FIG. 1 illustrates an axonometric view of the spectacles according to the present invention.
Figure 2:
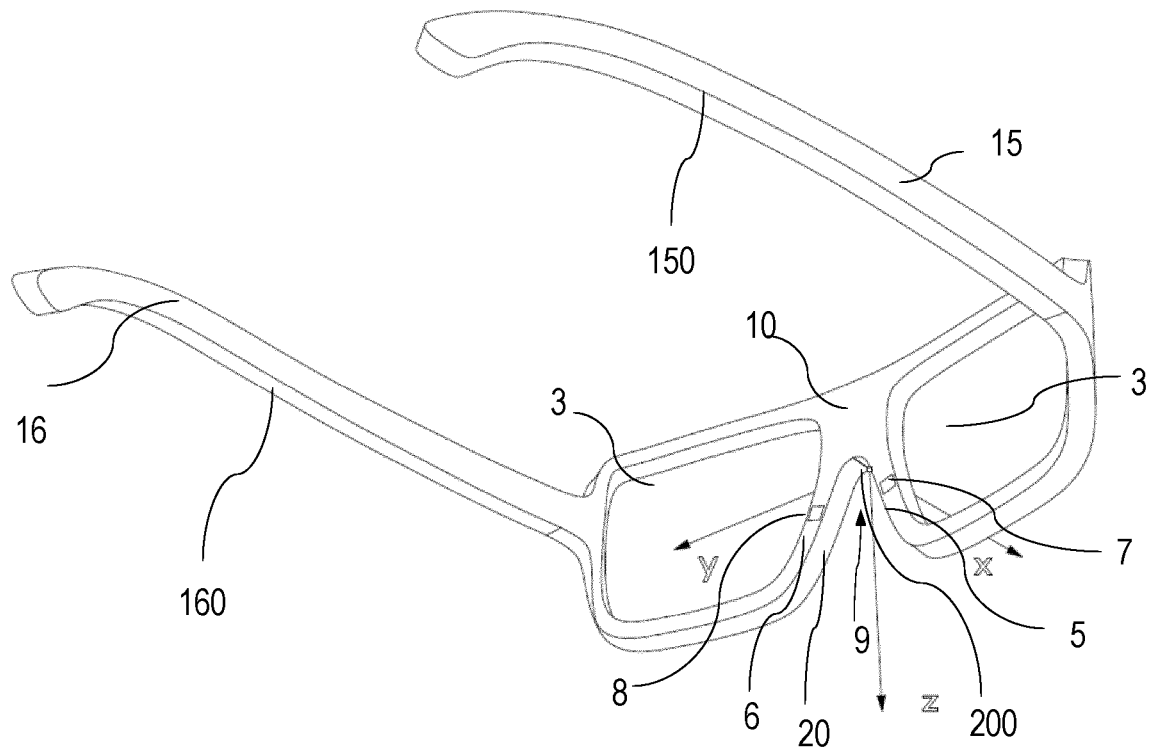
FIG. 2 illustrates a further axonometric view of the spectacles according to the present invention.
Figure 3:
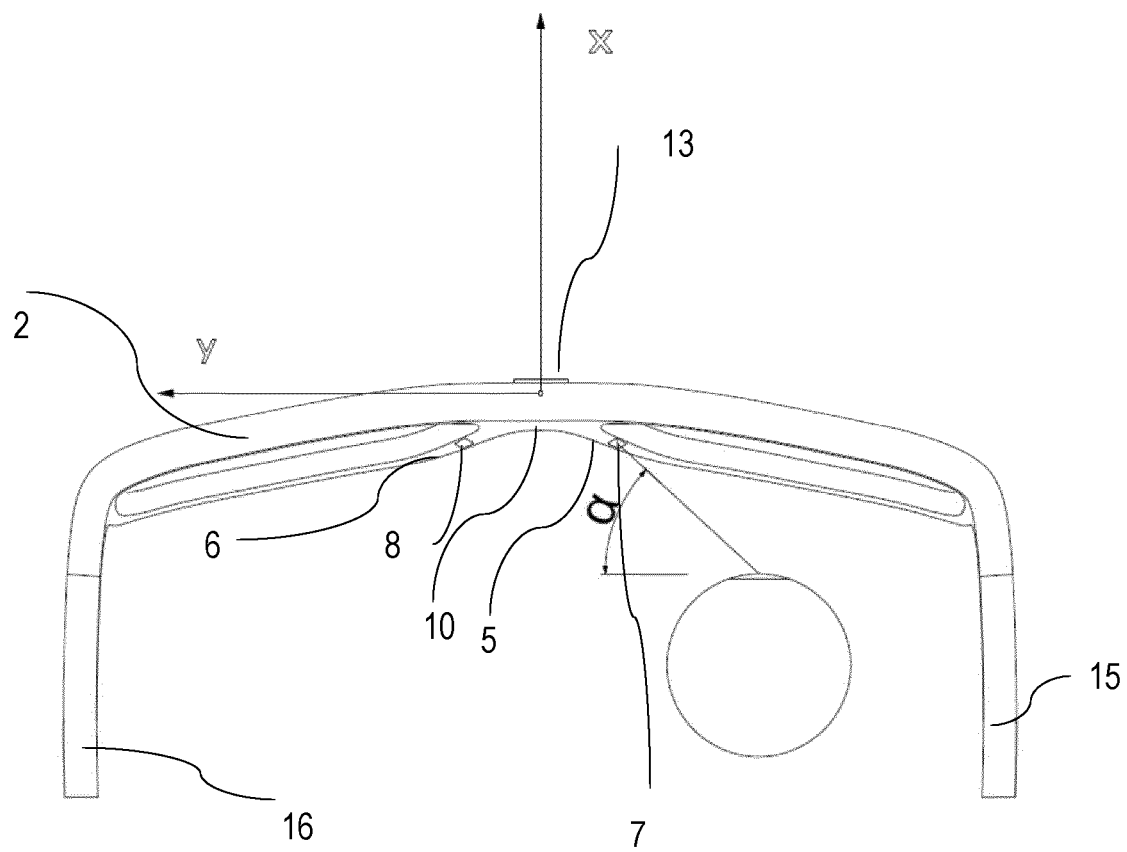
FIG. 3 illustrates a top view of the spectacles according to the present invention.
Figure 4:
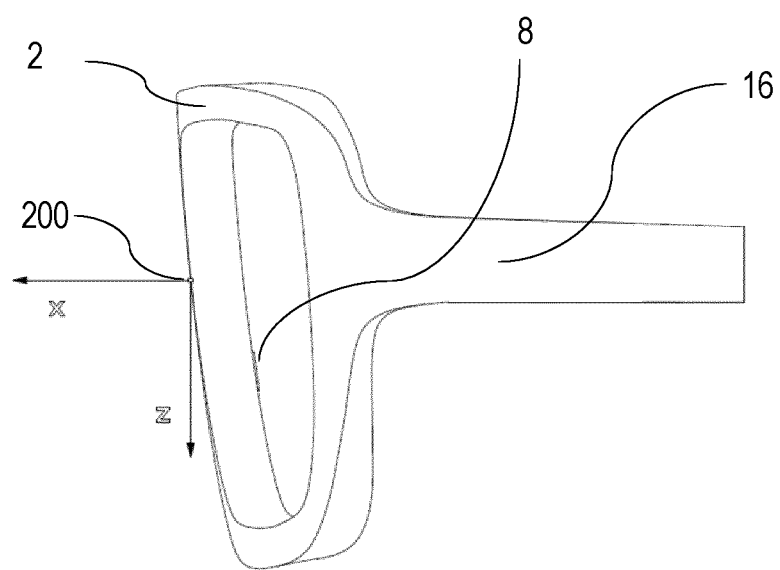
FIG. 4 illustrates a side view of the spectacles according to the present invention.
Figure 15:
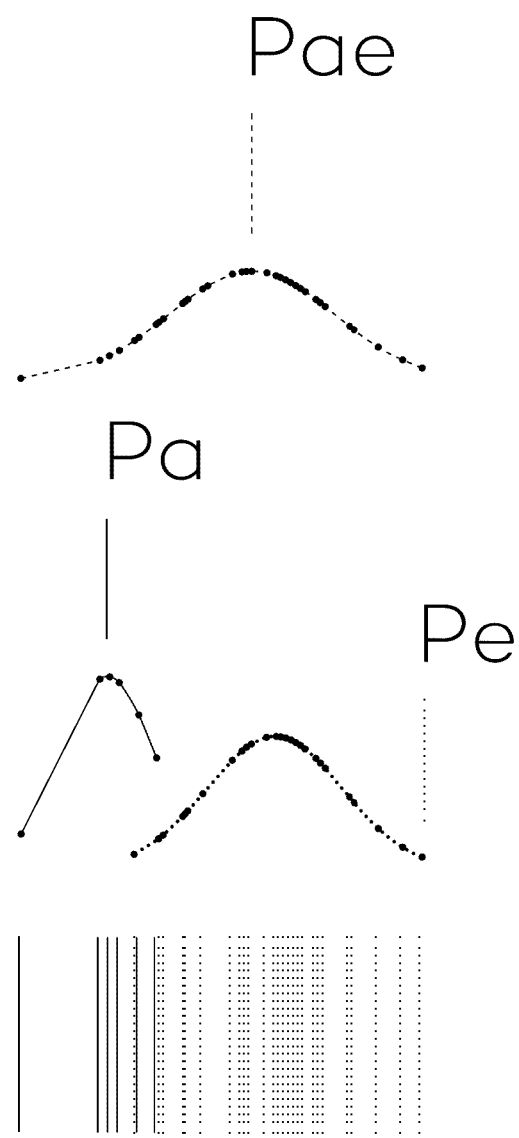

FIG. 5a highlights disadvantages regarding a first prior art scenario; FIG. 5b shows a picture representative of the relevant scenario and FIG. 5c shows charts regarding the distribution of pupil positions of different tested persons (both Asian and European/North American persons);

FIG. 6a highlights disadvantages regarding a second prior art scenario; FIG. 6b shows a picture representative of the relevant scenario and FIG. 6c shows charts regarding the distribution of pupil positions of different tested persons (both Asian and European/North American persons);

FIG. 7a highlights disadvantages regarding a third prior art scenario; FIG. 7b shows a picture representative of the relevant scenario and FIG. 7c shows charts regarding the distribution of pupil positions of different tested persons (both Asian and European/North American persons);

FIG. 8a highlights disadvantages regarding a fourth prior art scenario; FIG. 8b shows a picture representative of the relevant scenario and FIG. 8c shows charts regarding the distribution of pupil positions of different tested persons (both Asian and European/North American persons);

FIG. 9a highlights advantages regarding a first scenario according the present invention; FIG. 9b shows a picture representative of the relevant scenario and FIG. 9c shows charts regarding the distribution of pupil positions of different tested persons (both Asian and European/North American persons);

FIG. 10a highlights advantages regarding a second scenario according the present invention; FIG. 10b shows a picture representative of the relevant scenario and FIG. 10c shows charts regarding the distribution of pupil positions of different tested persons (both Asian and European/North American persons);

FIG. 11a highlights advantages regarding a third scenario according the present invention; FIG. 11b shows a picture representative of the relevant scenario and FIG. 11c shows charts regarding the distribution of pupil positions of different tested persons (both Asian and European/North American persons);

FIG. 12a highlights advantages regarding a fourth scenario according the present invention; FIG. 12b shows a picture representative of the relevant scenario and FIG. 12c shows charts regarding the distribution of pupil positions of different tested persons (both Asian and European/North American persons);

FIG. 13a highlights advantages regarding a fifth scenario according the present invention; FIG. 13b shows a picture representative of the relevant scenario and FIG. 13c shows charts regarding the distribution of pupil positions of different tested persons (both Asian and European/North American persons);

FIG. 14a highlights advantages regarding a sixth scenario according the present invention; FIG. 14b shows a picture representative of the relevant scenario and FIG. 14c shows charts regarding the distribution of pupil positions of different tested persons (both Asian and European/North American persons);

FIG. 15 shows charts regarding the distribution of pupil positions of different tested persons (both Asian and European/North American persons) in a more enlarged and clear view.

DETAILED DESCRIPTION OF THE INVENTION

In general, this disclosure describes improved spectacles, system and method of eye tracking able to detect the pupil position of a wearer.

The eye tracking spectacle 1 has a frame 2, wherein the frame 2 has at least one receiving opening/lens receptacle opening 3 for a disk-like structure, and wherein the frame 2 has a right nose frame part 5 and a left nose frame part 6, wherein a right eye acquisition camera 7 is arranged in the right nose frame part 5, and a left eye acquisition camera 8 is arranged in the left nose frame part 6.

The frame 2 has a U-shaped portion 9, which is provided for arranging the spectacles 1 on the nose of a human. The regions of the frame 2 which laterally border this recess are referred to as the right nose frame part 5 and the left nose frame part 6. The right and the left nose frame parts 5, 6 are preferably regions of the frame 2 enclosing the receiving opening/lens receptacle openings 3 which merge directly and/or integrally into the further regions of the frame 2. The right and the left nose frame parts 5, 6 may be also a right and a left part of a U-shaped portion 9 created by the shape of lenses of the spectacles.

Due to the integration of the eye acquisition cameras 7, 8 in the nose frame parts 5, 6, the spectacles 1 do not have any protruding parts, and are therefore suitable to be worn as work spectacles or protective spectacles. The viewing movements of a worker or of a human operating a machine can thus not only be monitored and analysed, but rather can be used directly for controlling the machine. In addition, the capability for controlling a machine can thus be monitored, since the physical and mental state of the relevant human can be concluded on the basis of the eye movements, for example, whether he is overtired or under the influence of psychotropic substances. Thus, above all in the case of public use of the spectacles 1, significantly improved results can be achieved, because the measurement accuracy is increased, and also the measurement apparatus can now no longer be perceived by the surroundings and therefore also does not result in negative influences of the test person.

It is preferably provided that the spectacles 1 have at least one nose bridge receptacle (not shown in the drawings) for accommodating at least one nose bridge. The nose bridge receptacle is arranged in this case in or on the U-shaped portion 9 of the frame 2.

The specifications "right" or "left" or "high" or "low" relate to the intended manner of wearing the spectacles 1 by a human being.

Different-shaped nose bridges may be used in the spectacles 1 by way of the nose bridge receptacle, and the spectacles can thus be adapted to different nose geometries, whereby the spectacles 1 can be adapted using simple means to different humans, wherein it can also be provided in particular that nose bridges are intentionally adapted to single individuals in case it is needed to further optimize the detection of the wearer's pupils besides of what is achieved by the present invention. The spectacles 1 may further be provided in a set or system together with different-shaped nose bridges (not shown in the drawings), for further predefinable adaptation of the spectacles 1 to different persons by replacement of the nose bridges.

As mentioned before the right eye acquisition camera 7 is arranged in the right nose frame part 5, and the left eye acquisition camera 8 is arranged in the left nose frame part 6. The two eye acquisition cameras 7, 8 are designed as digital cameras and have an objective lens. The two eye acquisition cameras 7, 8 are each provided to film one eye of the human wearing the relevant spectacles 1, and to prepare in each case an eye video including individual eye images or individual images.

The eye acquisition cameras 7, 8 have a suitable focal length to acquire the corresponding regions of the eye from the position in the nose frame part. The focal length and the aperture angle which can be acquired using a focal length are dependent on the sensor size of the camera and can be selected without problems by the embodying person skilled in the art using the present specifications.

A primary purpose of the eye acquisition cameras 7, 8 is to acquire the pupil of the human wearing the spectacles 1, therefore they must be directed towards the position of the eyeball of the wearer.

Applicant realised that there are a lot of differences between the shape of the head, nose, forehead of human beings therefore it could be difficult to rely on any position of the eye cameras on the nose frame.

A coordinate system is shown in the relevant FIGS. 1, 2 and 5 to 14. Proceeding from the symmetry of the relevant spectacles 1, this coordinate system was selected such that the YZ plane passes through the highest point 200 of the U-shaped portion 9 and is spanned by the Y axis and the Z axis on the right and left sides of the spectacles each intersect opposing and symmetrically-arranged regions. Therefore the point Z1=0 corresponds to the highest point of the nose frame, while the point Z2 corresponds to the lowest point of the nose frame of the spectacles. The XZ plane spanned by the X axis and the Z axis is arranged on the YZ plane perpendicularly and corresponds to the plane of symmetry of the spectacles. The XY plane is arranged perpendicularly to the YZ plane and the XZ plane. The axis Z is directed downward.

Therefore the right eye acquisition camera 7 and the left eye acquisition camera 8 are each arranged inclined in relation to these planes or axes.

The inventor faced with interferences with eyelashes, eyelids, cheekbones, due to different shape of the nose of people and furthermore different types of typical somatic traits, found a determined relation regarding respectively the position of the spectacles to the nose bridge of the human being and the orientation of the eye cameras to axis Z, having in any case regard to avoid using any particular nose bridges.

Regarding the shape of the nose some consequences occur on the way to wear the glasses, in particular it is found that if a nose is thin, the position of the glasses is low with regard to the nose bridge, meaning the nose bridge as the part of the head of a human being where starts his nose. On the contrary if the nose is large, the position of the glasses is very high in relation to the nose bridge of the wearer. Furthermore having regard to the position of the eye cameras along the Z axis it was realised that an higher position of the cameras too close to Z=0, i.e. to the highest point 200 (the maximum) of the U-shaped portion 9 gives a lot of problem of interference with eyelashes, eyelids as shown in FIGS. 5, 6 and problems of non detecting the pupils of the wearer in the spectacles fit too high (see FIG. 8). On the contrary having regard to the position of eye cameras too low, i.e. near the lowest points of the nose frame of the spectacles, the video detected by the cameras are affected by distortion problems, thus obtaining video where there are loss of information on the corners of the field of view (see FIG. 7). Moreover a lower position of the eye cameras leads to interference problem with eyelids, eyelashes and in some cases cheekbones of the wearer (see FIG. 6).

Moreover it is found that the prior art angles referred to the vertical axes Z are too large and besides to detect few possible position of the pupils of tested person, and for sure the prior art orientation disclosed between angles 25°-35° is not able to detect the most of possible pupils of both Asian persons and European persons and furthermore detect very few possible pupils if there are cases where the spectacles fit too low and too far away from the nose bridge of the wearer.

In this case, according to one preferred embodiment, it is provided that in each case one optical axis 23 of the two eye acquisition cameras 7, 8 is arranged at an angle alpha in relation to the Y axis, and the angle alpha is between 30° and 50°, i.e. 30°≤alpha≤50°. Furthermore, it is provided according to the preferred embodiment that in each case one optical axis 23 of the two eye acquisition cameras 7, 8 and therefore the eye cameras 7, 8 are arranged at a Z coordinate referred to the Z axis, starting from Z=0 the highest point 200 (the maximum) in the U-shaped portion of the spectacles 1, in the range 3 mm≤Z≤15 mm. It must me pointed out that the origin (X=0, Y=0, Z=0) of this cartesian system assumed, is positioned on the highest point 200 i.e. the maximum of the concave profile of the U-shaped portion 9 clearly visible for instance in the FIG. 1 or in any case from a front view of the spectacles. In the case showed in the figures the highest point 200 is the most external point of the lower profile of the bridge 10 of the spectacles 1, but there could be cases where the lower profile of the bridge 10 of the spectacles 1 is rounded, therefore in that case the highest point 200 might not be the most external point of said lower profile of the bridge 10 of the spectacles 1.

It is found that this new range in the height position of the eye cameras along the Z axis is an optimised compromise in order to avoid interference problems with eyelids/eyelashes and it is a good compromise with different shape of noses from the ones thinner to the ones larger.

Furthermore a second angle beta in relation to the Z axis is optimised between 17.5° and 22.5°, achieving a very good compromise in order to being able to detect the most possible pupils position of different types of ethnics wearers, i.e. both Asian and European people, and possible different position of the spectacles on the head of the wearer i.e. low+far, high+close, and so on.

In a second embodiment of the present invention it is verified that positioning the eye cameras in a narrower subrange along the Z axis is a better solution contemplating problem of distortions, eyelid/eyelashes/cheekbones interference, able to get the highest probabilities distributions according to the chart marked PAE, i.e. with 3 mm<Z≤12 mm.

Furthermore according to said subrange in order to detect the highest probabilities distributions according to the chart marked PAE of the most possible pupils of different types of people belonging to different kind of ethnics (see FIGS. 9-14 and in particular 15) it is established the following subrange regarding the angle beta:

second beta angle in relation to the Z axis is optimised between 18.0° and 21.0°.

As mentioned before prior art technology is characterised by some problems in detecting pupil center of a large variety of human being with different somatic traits, and also regarding interferences with eyelashes, eyelid, cheekbones, or shadows thereof. The figures that are commented hereinafter are side views and comprise continuous segments and PA distribution curve (Gaussian distribution) illustrating possible position of Asian people, dotted segments and PE distribution curve (Gaussian distribution) illustrating possible position of European/north American people, and a further PAE distribution curve (Gaussian distribution) illustrating all possible position of human being tested by the applicant. The distribution curve represents a predetermined range of distance nose bridge to pupil in the X axis and how many persons fall in said range of distance nose bridge to pupil in the Y axis. In each case the position of the eye cameras 7, 8 are illustrated by the playback symbol with its optical axis ending with an arrow. Furthermore in some case are inserted the real pictures of the tested person's eyes detected in that specific case under the described conditions.

FIG. 5 shows a normal+close position of the spectacles on the head of a wearer, i.e. with "normal" it is intended a position of the spectacles fitted onto a normal nose, not particularly thin and not particularly large, and with "close" position it is intended a position of the spectacles fitted very close to the eyeball of the wearer due in general to a very short distance from the nose bridge of the wearer to his eyeball, typical case of Asian people. Furthermore the eye cameras are arranged with a Z coordinate in the prior art region Z1-Z3.

In this case there could be possible interferences with higher eyelids/eyelashes if the eye cameras are arranged with a Z coordinate in the prior art region Z1-Z3 as clearly shown in FIG. 5.

FIG. 6 shows a high+close position of the spectacles on the head of a wearer, i.e. with "high" it is intended a position of the spectacles fitted onto a large nose for instance, and eye cameras arranged with a Z coordinate in the prior art region Z4-Z2.

In this case there could be possible interferences with lower eyelids/eyelashes and also problems with cheekbone shadows if the eye cameras are arranged with a Z coordinate in the prior art region Z4-Z2 as clearly shown in FIG. 6.

FIG. 7 shows a high+close position of the spectacles on the head of a wearer and eye camera arranged with a Z coordinate in the prior art region Z4-Z2. In this case it is clearly shown that using a prior art orientation angle in the range 25°-35° said eye cameras detect few possible pupils and in particular are not able to detect Asian human being pupils (continuous segments).

FIG. 8 shows a low+far position of the spectacles on the head of a wearer and eye camera arranged with a Z coordinate in the prior art region Z1-Z3. With "low" it is intended a position of the spectacles are fitted onto a thin nose, and with "far" position it is intended a position of the spectacles fitted very far away from the eyeball of the wearer due in general to a very long distance from the nose bridge of the wearer to his eyeball, some typical case of European/North American people.

In this case it is clearly shown that using a prior art orientation angle in the range 25°-35° said eye cameras detect few possible pupils and in particular are able to detect only few European/North American human being pupils (dotted segments).

FIG. 9 shows a normal+close position of the spectacles on the head of a wearer and eye camera arranged with a Z coordinate in the highest extreme Z3 of the new claimed range. In this case as it is immediately recognized in the figure there is no interferences with eyelids/eyelashes during the detection of the wearer pupils.

FIG. 10 shows a high+close position of the spectacles on the head of a wearer and eye camera arranged with a Z coordinate in the lowest extreme Z4 of the new claimed range. In this case as it is immediately recognized in the figure there is no interferences with eyelids/eyelashes/cheekbones during the detection of the wearer pupils.

Therefore the entire range Z3-Z4 clearly solve the prior art problems, achieving optimum results in detecting different pupil positions due to the different somatic traits typical of different ethnic groups.

FIG. 11 shows a high+close position of the spectacles on the head of a wearer and eye camera arranged with a Z coordinate in the lowest extreme Z4 of the new claimed range and using the new claimed higher angle beta extreme 22.5°. In this case as it is immediately recognized in the figure, the higher angle beta extreme is able to detect the most possible position of both Asian and European/North American people.

FIG. 12 shows a low+far position of the spectacles on the head of a wearer and eye camera arranged with a Z coordinate in the lowest extreme Z3 of the new claimed range and using the new claimed lower angle beta extreme 17.5°. In this case as it is immediately recognized in the figure, the higher angle beta extreme is able to detect the most possible position of both Asian and European/North American people.

Therefore also the entire range 17.5°-22.5° in the beta angle clearly solve the prior art problems, further improving the detection of different pupil positions due to different somatic traits typical of different ethnic groups.

FIG. 13 shows a high+close position of the spectacles on the head of a wearer and eye camera arranged with a Z coordinate in the new claimed range Z3-Z4 and using the new claimed lower angle beta extreme 17.5°. In this case it is further confirmed that the entire new claimed range regarding angle beta is able to detect the most possible position of both Asian and European/North American people.

FIG. 14 shows a low+far position of the spectacles on the head of a wearer and eye camera arranged with a Z coordinate in the new claimed range Z3-Z4 and using the new claimed higher angle beta extreme 22.5°. In this case it is further confirmed that the entire new claimed range regarding angle beta is able to detect the most possible position of both Asian and European/North American people.

Furthermore different nose bridges can be used for adapting the spectacles 1, as already described. Alternatively and/or additionally thereto, it can be provided that the right eye acquisition camera 7 and/or the left eye acquisition camera 8 are arranged so they are pivotable about at least one axis, in particular about two axes, in the right nose frame part 5 or the left nose frame part 6. The viewing direction of the right and/or left eye acquisition camera 7, 8 can thus be adjusted. An adaptation of the spectacles 1 to different head shapes is thus possible.

According to one preferred embodiment of present spectacles 1, it is provided that at least one field of vision camera 13 is arranged on the frame 2. The field of vision camera 13 is provided to record a field of vision video including individual and successive field of vision images. The recordings of the two eye acquisition cameras 7, 8 and the at least one field of vision camera 13 can thus be entered in correlation in the field of vision video of the respective viewpoint. The field of vision camera 13 is only explicitly shown in FIG. 1 on the spectacles 1.

It is preferably provided that the at least one field of vision camera 13 is arranged in a region or a bridge 10 between the right nose frame part 5 and the left nose frame part 6. A larger number of field of vision cameras 13 can also be arranged in the spectacles 1, wherein in particular one left and one right field of vision camera is provided in the frame 2 in each case in the region of the transition to the first or second earpiece 15, 16, respectively.

It is preferably provided that the spectacles 1 have a data processing unit and a data interface, the data processing unit is connected to the right eye acquisition camera 7 and the left eye acquisition camera 8. The spectacles 1 furthermore may have an energy accumulator for the energy supply of the right eye acquisition camera 7 and the left eye acquisition camera 8, and also the data processing unit and the data interface.

According to one particularly preferred embodiment of present spectacles 1 it is provided that the data processing unit and the data interface may are arranged in the first earpiece 15, and the energy accumulator may be arranged in the second earpiece 16. In this case, the first earpiece 15 can either be the right or the left earpiece, and vice versa. The entire recording, initial analysis, and storage of the recorded videos can thus be performed in or by the spectacles 1 themselves. Interfering connections can thus be omitted.

A data processing unit also comprises a data memory. It is preferably designed as a combination of a microcontroller or DSP together with a RAM. The data processing unit is connected in a signal-conducting manner to a data interface. It can also be provided that the data interface and the data processing unit are formed jointly in hardware, for example, by an ASIC or an FPGA. The interface is preferably designed as a wireless interface, for example, according to the Bluetooth standard or IEEE 802.x, or as a wired interface, for example, according to the USB standard, wherein in this case the spectacles 1 have a corresponding socket, for example, according to micro-USB. Additional sensors could be inserted in the spectacles and connected with the data processing unit.

The data processing unit and the data interface may be connected at least indirectly to the energy accumulator by circuitry, and are connected in a signal-conducting manner to the three cameras, the field of vision camera 13, the right eye acquisition camera 7, and the left eye acquisition camera 8.

As already described, the present described spectacles 1 are particularly well suitable for carrying out a method for determining pupil center points of both eyes of a human. In this case, it is provided that the right pupil of the human is acquired by the right eye acquisition camera 7, wherein the right eye acquisition camera 7 prepares a right eye video including successive right individual images, wherein the right pupil coordinates within the right eye images of a focal point—corresponding to the right pupil center point—of the right pupil are ascertained from the right eye images, wherein the left pupil of the human is acquired by the left eye acquisition camera 8, wherein the left eye acquisition camera 8 prepares a left eye video including successive left individual images, wherein pupil coordinates within the left eye images of a focal point—corresponding to the left pupil center point—of the left pupil are ascertained from the left eye images, and wherein the right pupil center point and/or the left pupil center point is/are stored and/or output.

A detection of the viewing direction of both eyes can thus be acquired. The viewing direction of a human can thus be determined with a high level of accuracy. Additionally or alternatively, the focus distance or the focal distance of the eyes of the relevant human can thus be ascertained. A blink can thus be recognized as a spontaneous blink, whereby it is possible to differentiate reliably between different states of the relevant human, for example, between a state of high concentration and a state of fatigue.

It is preferably provided that a computer objective lens distortion correction is carried out in each case for the two eye acquisition cameras 7, 8 and the field of vision camera 13, as well as a correction of prospective distortions.

The two eye videos and the field of vision video are recorded in chronological synchronization, which is controlled by the data processing unit.

The ascertainment of the pupil coordinates and the correlation with a field of vision video, as is also preferably provided in the present spectacles 1 or present method, is described in EP 1 300 018 B1.

In the preferred method, the precise pupil coordinates of the pupil center point in the eye video are ascertained by an image recognition program. In this case, the pupil coordinates are ascertained for each individual image of the eye video. The ascertainment of the pupil coordinates is preferably performed automatically using an image recognition program. For this purpose, for each individual image of the eye video, the contrasts of the pupils to the surroundings are registered and all points of the individual image which are darker than a set degree of darkness are searched for. Using these points, a dark area is completely acquired and delimited, and the focal point of this dark area is then automatically ascertained. Because the dark area corresponds to the pupil of the test person, the focal point of the dark area represents the pupa center point. The image recognition program preferably offers setting variants for the corresponding contrast and the degree of darkness, so that a particularly high level of accuracy can be achieved for all individual images. As already noted above, points can additionally be selected on the edge of the pupil, which can be identified particularly well and reliably because of the contrast to the surroundings, and these points can be taken as part of an ellipse, whereupon the focal point or center point of an ellipse is calculated, on the circumference of which the pre-definable number of points also lie. For each individual image, the best contrast in each case in the form of a grayscale value threshold can therefore be ensured for different lighting conditions, which makes reliable determination of the pupil coordinates possible overall. The grayscale value threshold is the value which is, for example, in digitized form between 1 and 256 and defines the percentage proportion of black or white on a pixel. The highest achievable value corresponds to solid black, and the lowest value to white. Because the pupil presumably never reaches the solid black value during the recording, a value is to be defined which—at least for this image—corresponds to the real existing pupil gray. The threshold value excludes all pixels which are brighter than the defined gray value, all darker regions are used for finding the focal point. Three parameters enable the threshold definition to be optimized. Because the lighting conditions often change very strongly during the experiments within the sequence, this threshold value definition is preferably also possible individually for each image. All settings can be stored in accordance with the high requirements for each image of the sequence in a file.

Proceeding from the ascertained pupil coordinates, the file can be processed further differently, for example, by the correlation described in EP 1 300 018 B1 with a field of vision video, which is prepared by the field of vision camera.

It is preferably provided that the spectacles 1 are calibrated on the basis of a pre-definable viewing sequence before ascertaining the pupil center points. For this purpose, firstly one or more pattern viewing sequences of the test person on one or more specific predefined control points are recorded. A pattern viewing sequence is to be understood as a viewing sequence which is recorded solely for the calibration, and during which the test person looks at predefined control points. For example, a specific control point can be marked on a wall. To obtain the best possible contrast, for example, a black marking on an otherwise white surface can be selected as a control point. The control point is generally a cross or a spot of light or the like. The test person is instructed to fix on this control point, wherein the field of vision and the eye of the test person are recorded by the two eye acquisition cameras and the field of vision camera. The control points to be targeted are additionally preferably arranged at different defined intervals.

According to a preferred refinement of the present spectacles, it is provided that at least one illuminant, in particular an LED, is arranged on a front side of the spectacles 1, and the illuminant is connected to the data processing unit and the energy accumulator or a suitable power connection. In this case, the side facing away from the wearer of the spectacles 1 is identified as the front side of the spectacles 1. Simple and automatable calibration of the spectacles 1 is possible by way of the illuminant. The illuminant is controlled for this purpose by the data processing unit.

It is preferably provided in this case that a reflective surface, in particular a mirror, is arranged opposite to the human wearing the spectacles, or the relevant human is placed in front of a mirror, and the illuminant is activated for the calibration of the spectacles 1. The relevant human now observes his image in the mirror and fixes on the image of the illuminant in this case. By pre-definable variation of the position of the head with continuous fixation on the illuminant image in the mirror, the positions of the pupils change in relation to the spectacles 1 or the eye acquisition cameras 7, 8. Because the wavelength or color of the illuminant is known, it can be easily recognized by the field of vision camera 13 and the data processing unit.

As already mentioned, it is possible, using the present spectacles 1 and the above-described method in the refinement thereof, to recognize a spontaneous blink as such, in contrast, for example, to the lid movements as are triggered by a foreign body entering the eye. It is provided in this case that furthermore, the right eyelids are detected in the successive right individual images, wherein the left eyelids are detected in the successive left individual images, and wherein, when a right eyelid conceals the right pupil center point in a right individual image and a left eyelid conceals the left pupil center point in one of the individual images, a message of a spontaneous blink is generated and output and/or stored. The relevant right and left individual images which are set forth in the mentioned condition are each individual images recorded substantially simultaneously with respect to time.

In order to detect the eyelids, it is provided that firstly the respective pupils are completely acquired. By means of an image processing program having pattern recognition, it is easily possible to recognize the concealment of the pupil continuously progressing from one image to the next as such and to differentiate it from a highlight. A regional concealment of the respective pupils can be easily and reliably assigned to a blink in this manner.

In a refinement of the relevant method for the method for recognizing a spontaneous blink, it is furthermore provided that a visual downtime between the beginning of a spontaneous blink and the end of the same spontaneous blink is measured, and if a limiting time is exceeded by the visual downtime, a warning message is generated and/or output. The physical and/or mental state of a human can thus be easily monitored. Present spectacles 1 can thus monitor, in cooperation with a machine, whether the human operating the machine applies the attentiveness considered to be required for this activity. Thus, for example, the spectacles 1 can analyze on the basis of the blinking activities of the relevant operator whether he is overtired, and safe further operation of the machine is endangered. The spectacles 1 can then, for example, emit a warning message to turn off the relevant machine or can trigger other switching procedures.

In a refinement of the method for determining the pupil center points of both eyes of a human, it is provided that furthermore the focus distance of a human is ascertained, wherein an interocular distance is ascertained from the pupil coordinates in the individual images of the field of vision video, wherein a right viewing angle is assigned to the right pupil coordinates, wherein a left viewing angle is assigned to the left pupil coordinates, and wherein the focus distance is ascertained from the interocular distance, the right viewing angle, and the left viewing angle, and is preferably stored and/or output. In particular, switching pulses or switching commands can be generated and output in this case.

In this case, to ascertain the focus distance, the interocular distance and the respective viewing angle of the two eyes are ascertained. The interocular distance forms the base of an imaginary triangle, wherein the viewing angles of the two eyes represent the angles which the two sides occupy in relation to the base. The height of the relevant triangle can be easily ascertained therefrom as the focus distance or focal distance, where it can be established more accurately at which point a human is actually looking.

In addition, misalignments of the eyes can be recognized easily and reliably by individual measurements on the two eyes of a test subject. It can be necessary in this case to calibrate the eye acquisition cameras 7, 8 separately in each case for the two eyes, for example, in that one eye is covered.

According to one advantageous refinement of the invention, it can be provided that the ascertained focus distance is used to set or control lenses, which are arranged in the receiving openings/lens receptacle openings 3, having variable or pre-definably variable geometry. It is preferably provided in this case that the at least one lens is connected to the data processing unit. To set the relevant geometric parameters on the relevant lens, it is necessary for the respective focus distances or distance intervals to be determined to be stored in the memory assigned to the data processing unit. The relevant parameters can each contain multiple variables for each focus distance in this case. In order to set the geometry of the relevant lenses, it is preferably provided that at least one value, which is associated with the ascertained focus distance, for the geometric determination of the lens having pre-definable variable geometry is taken from the data memory, and the geometry of the lens is set on the basis of the value. Spectacles 1 can thus be provided, which can provide reliable aid even in the case of complicated visual impairments.

In addition, anomalies, predominantly in the pupils and/or iris region, can be recognized from the images of the two eyes.

In conjunction with pre-definable experimental sequences to be carried out, the navigation structures or patterns of the eyes can be recorded simultaneously. In addition, they can be analyzed and compared, so that real ophthalmological initial examinations are possible.

Although specific embodiments have been described above with respect to specific features for each embodiment, it will be understood that the invention is not limited to the embodiments described, in the described form. In particular, any feature from any embodiment is combinable with any other feature from any other embodiment, without necessarily comprising all features of the embodiments.

The invention claimed is:

1. An eye tracking spectacles comprising:
a frame,
the frame having at least one receiving opening for receiving a disk-like structure, and
wherein the frame has a U-shaped portion, which is provided for arranging the spectacles on the nose of a human,
said U-shaped portion has a right nose frame and a left nose frame and a bridge between the right nose frame and the left nose frame,
wherein a right eye detection camera is arranged in a right nose part frame, and wherein a left eye detection camera is arranged in a left nose part frame,
said spectacles further comprising a first earpiece and a second earpiece, wherein the left eye detection camera and the right eye detection camera are arranged in the corresponding nose part frame in a position with a Z coordinate referred to a Z axis of a Cartesian system in the range 3 mm Z 15 mm,
said Cartesian system (X, Y, Z) being placed with its origin corresponding to a maximum of a concave front profile of the U-shaped portion of the spectacles and X axis of the Cartesian system is parallel to the lower profile of the earpieces, being the plane XZ of the Cartesian system the symmetry plane of the spectacles, and Z axis is directed downward, thus avoiding the risk to have eyelids, eyelashes, and cheekbones interferences considering also different nose shapes of different somatic traits of different ethnicities, during the detection of pupil center of a wearer when in use, and wherein the right eye detection camera and the left eye detection camera are oriented respect to the Z axis with an angle beta, wherein 17.5° beta 22.5° thus allowing the spectacles to detect the possible pupil centers of a wearer of different ethnicities.

2. The spectacles according to claim 1, wherein the right eye detection camera and the left eye detection camera are arranged in the corresponding nose part frame in a position with a Z coordinate referred to the Z axis of the Cartesian system in the range 3 mm<Z 12 mm and wherein the right eye detection camera and the left eye detection camera are oriented respect to the Z axis with an angle beta, wherein beta is between 18.0° and 21.0°.

3. The spectacles according to claim 1, wherein at least one of the right eye detection camera or and/or the left eye detection camera can be pivoted in relation to the relevant part of the nose frame at least about one axis, in particular about two axes.

4. The spectacles according to claim 1, wherein the spectacles have at least one nose bridge receptacle for receiving at least one nose bridge, in particular designed as a saddle bridge.

5. The spectacles according to claim 1, wherein at least one field of view camera is arranged on the frame.

6. The spectacles according to claim 1, wherein the spectacles has a data processing unit and a data interface, the data processing unit being connected with the right eye detection camera and the left eye detection camera such that the spectacles, the data processing unit and the data interface preferably being arranged in a first earpiece connected to the frame, or being arranged in the second earpiece.

7. The spectacles according to claim 6, wherein at least one illuminant, in particular an LED, is arranged on a front of the spectacles and that the illuminant is connected with the data processing unit.

8. The spectacles according to claim 6, wherein a lens with a predeterminable changeable geometry is arranged in the at least one receiving opening, and that the lens is connected to the data processing unit.

9. A system consisting of a pair of spectacles according to claim 1, and a predeterminable number of differently shaped nose bridges for adapting the spectacles to different people by exchanging the nose bridges.

10. A method for determining pupil centers of both eyes of a person, the method comprising the following steps: the person wearing spectacles according to claim 1, the method further comprising the right pupil of the person being detected by the right eye detection camera, the right eye detection camera a right eye video consisting of successive right individual images is produced, right pupil coordinates of a center of gravity of the right pupil corresponding to the right pupil center being determined from the right individual images, the left pupil of the human being captured by the left eye detection camera, the left eye detection camera creates a left eye video consisting of successive left eye images, pupil coordinates of a center of gravity of the left pupil corresponding to the left pupil center are determined from the left eye images, and wherein at least one of the right pupil center or the left pupil center is at least one of stored or output, wherein to determine the pupil coordinates for each individual image of the eye video with an image recognition program automatically—the contrasts of the pupil with the surroundings are registered—all points of the individual image that are darker than a set degree of darkness, are sought, —a dark area corresponding to the pupil is fully detected and delimited with these points, and the center of gravity of the dark area corresponding to the pupil center is determined with the pupil coordinates.

11. The method according to claim 10, further comprising recognizing a spontaneous blinking of the eye of a human being, comprising the right eyelids being detected in the successive right eye images, wherein in the successive left eye images the left eyelids are detected, and when, in a right eye image, a right eyelid covers the right pupil center and in a left eye image a left eyelid covers the left pupil center, a message of spontaneous blinking is generated and output and/or saved.

12. The method according to claim 11, wherein a visual downtime is measured between the beginning of a spontaneous blinking and the end of the same spontaneous blinking, and wherein at least one of a warning message is generated or output when the timeout is exceeded by the visual downtime.

13. The method according to claim 10, further comprising determining a focus distance of a person, comprising an eye distance being determined from the pupil coordinates, the right pupil coordinates being assigned to a right viewing angle, the left pupil coordinates is assigned to a left viewing angle, and the focus distance is determined from the eye distance, the right viewing angle and the left viewing angle, and is at least one of stored or output, in particular as a switching pulse.

14. The method according to claim 13, wherein at least one value assigned to the determined focus distance for the geometric determination of a lens arranged in the receiving opening with predeterminable changeable geometry is taken from a data memory of a data processing unit, and that the geometry of the lens is set on the basis of the value.

\* \* \* \* \*